(12) United States Patent
Natsume

(10) Patent No.: US 7,310,528 B2
(45) Date of Patent: Dec. 18, 2007

(54) MOBILE STATION, RADIO COMMUNICATION ESTABLISHING METHOD AND ITS RADIO COMMUNICATION SYSTEM

(75) Inventor: Kouhei Natsume, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/092,670

(22) Filed: Mar. 30, 2005

(65) Prior Publication Data

US 2005/0221827 A1 Oct. 6, 2005

(30) Foreign Application Priority Data

Mar. 30, 2004 (JP) .............................. 2004-099583

(51) Int. Cl.
*H04Q 7/20* (2006.01)
(52) U.S. Cl. .................. 455/437; 455/436; 455/439; 455/442; 370/328; 370/338
(58) Field of Classification Search ............... 455/437, 455/436, 439, 422, 442; 370/328–338
See application file for complete search history.

(56) References Cited

U.S. PATENT DOCUMENTS

| 6,438,377 B1 * | 8/2002 | Savolainen ................. 455/439 |
| 6,631,263 B1 * | 10/2003 | Corkery ...................... 455/436 |
| 6,792,284 B1 * | 9/2004 | Dalsgaard et al. .......... 455/525 |
| 6,985,733 B2 * | 1/2006 | Binzel ........................ 455/437 |
| 7,106,711 B2 * | 9/2006 | Otting et al. ................ 370/331 |
| 2003/0081571 A1 * | 5/2003 | Hur ............................. 370/331 |
| 2004/0203882 A1 * | 10/2004 | Laiho et al. ............. 455/456.1 |
| 2005/0208942 A1 * | 9/2005 | Pekonen et al. ............ 455/436 |

FOREIGN PATENT DOCUMENTS

| JP | 04-344723 | 12/1992 |
| JP | 08-223110 | 8/1996 |

(Continued)

OTHER PUBLICATIONS

"3GPP TS 25.304 V3.12.0"; 3GPP Organization Partners, Technical Specification; Dec. 2002; pp. 1-40; retrieved from the web at URL http://www.3gpp.org/ftp/specs/html-info/25304.htm.
Mouley et al., "The GSM System for Mobile Communications—7.1 Location Management", Comprehensive Overview of the Euroopean Digital Cellular Systems, 1992, pp. 432-498.

*Primary Examiner*—Rafael Perez-Gutierrez
*Assistant Examiner*—Khai Nguyen
(74) *Attorney, Agent, or Firm*—Dickstein Shapiro LLP

(57) ABSTRACT

In a mobile station, a radio section is adapted to communicate with a plurality of base stations, and a control section is connected to the radio section. The control section is adapted to search for cells of the base stations to obtain broadcast information of radio signals of the base stations received by the radio section, select a serving cell of a specified one of the base stations and neighbor cells of other ones of the base stations neighbor to the serving cell in accordance with communication qualities of the radio signals of the base stations, and to set the serving cell and the neighbor cells in a communication connection preparing state.

27 Claims, 18 Drawing Sheets

FOREIGN PATENT DOCUMENTS

| | | |
|---|---|---|
| JP | 10-126830 | 5/1998 |
| JP | 11-289289 | 10/1999 |
| JP | 2002-027519 | 1/2002 |
| WO | WO 00/27158 | 5/2000 |
| WO | WO-00/28768 A1 | 5/2000 |
| WO | WO-02/45450 A1 | 6/2002 |

* cited by examiner

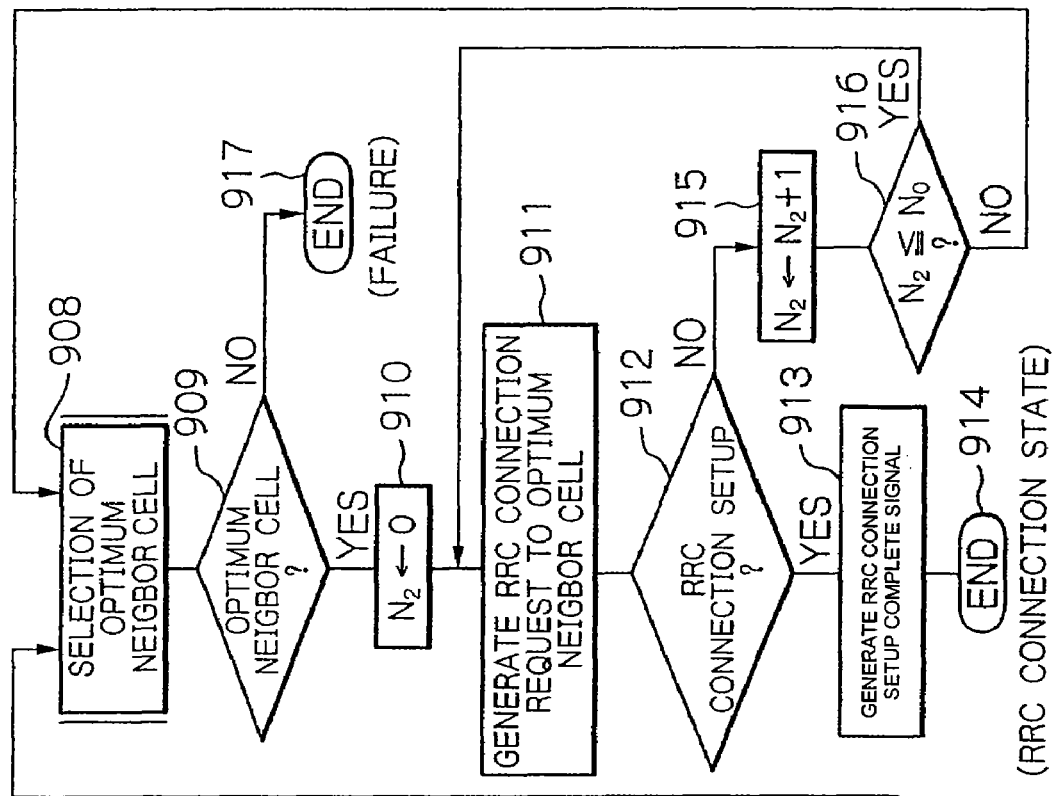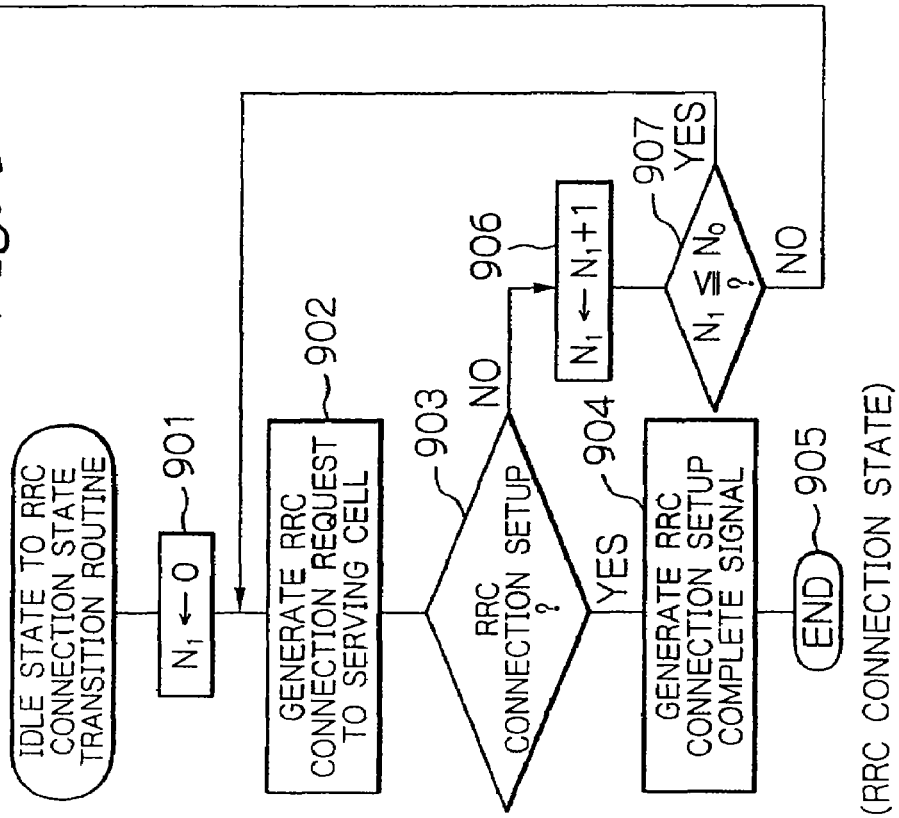
Fig. 9

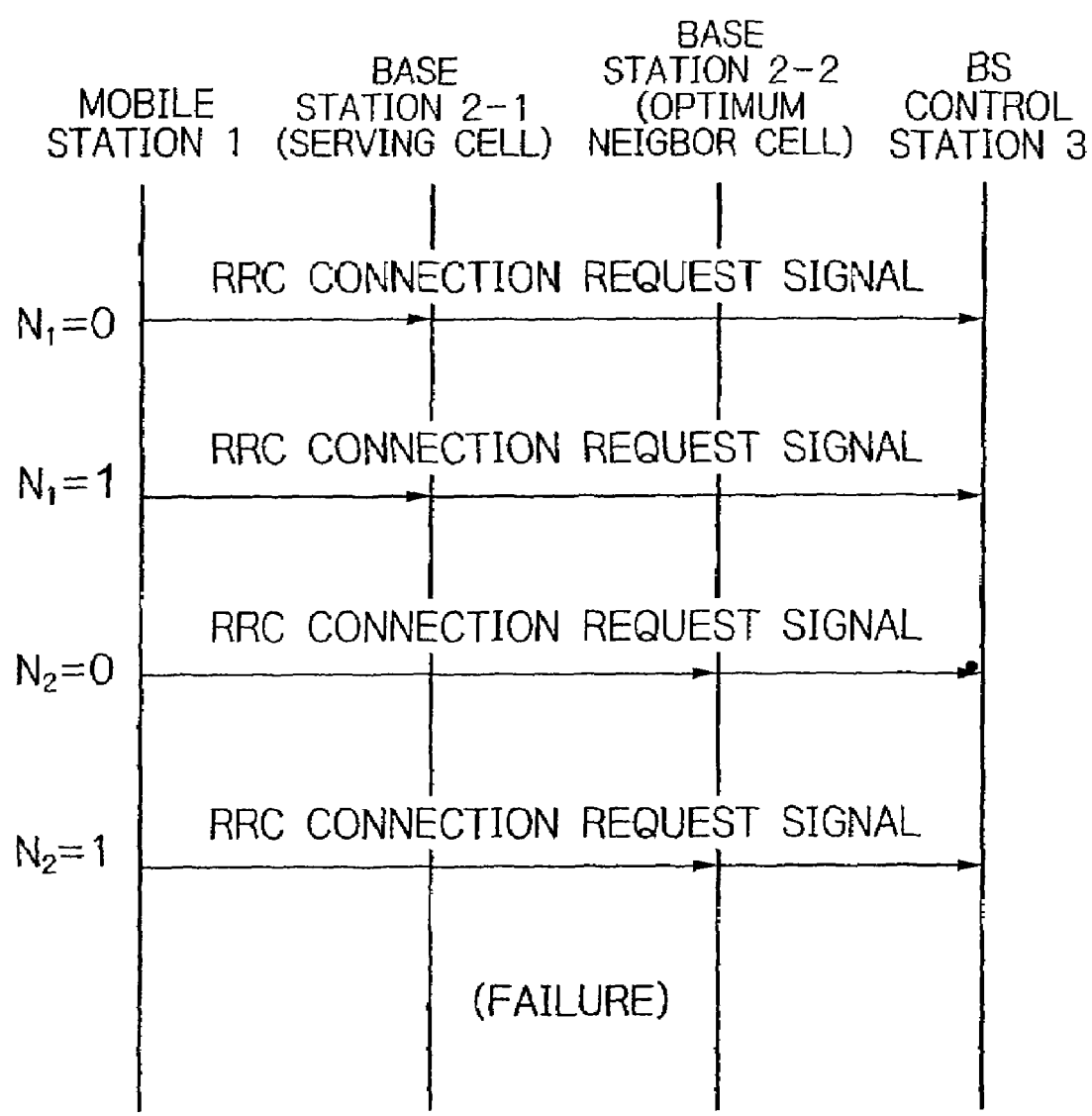

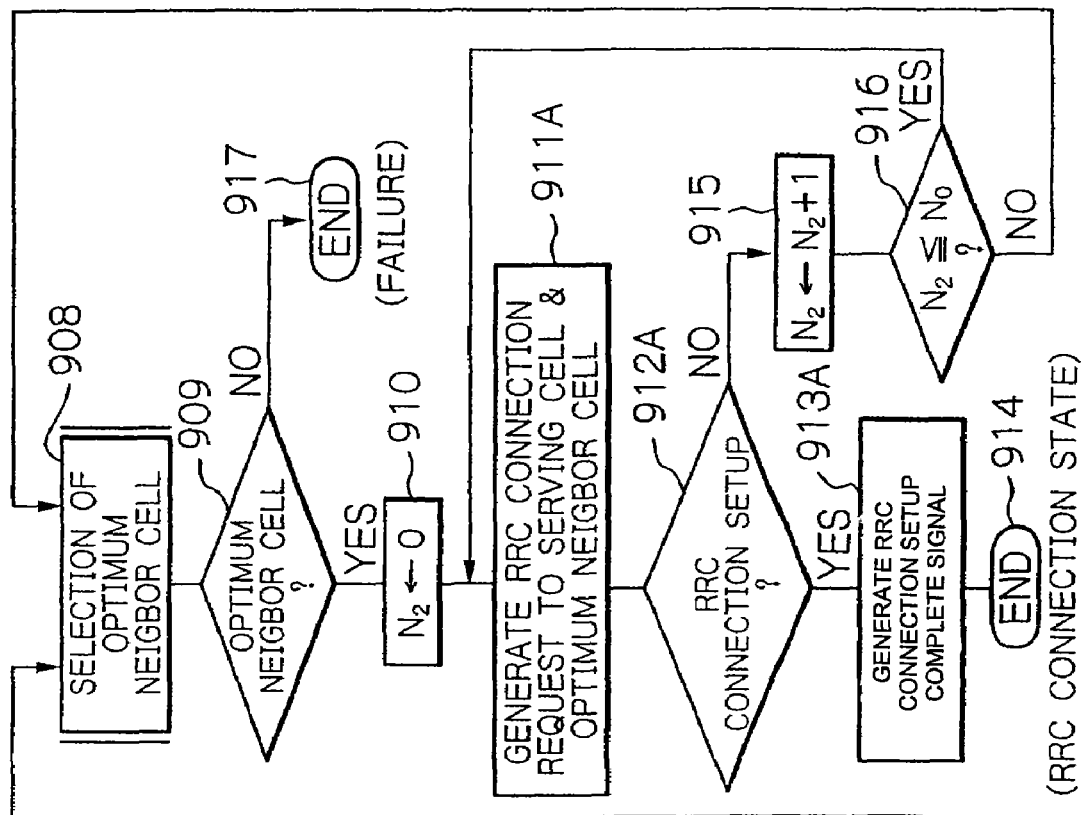
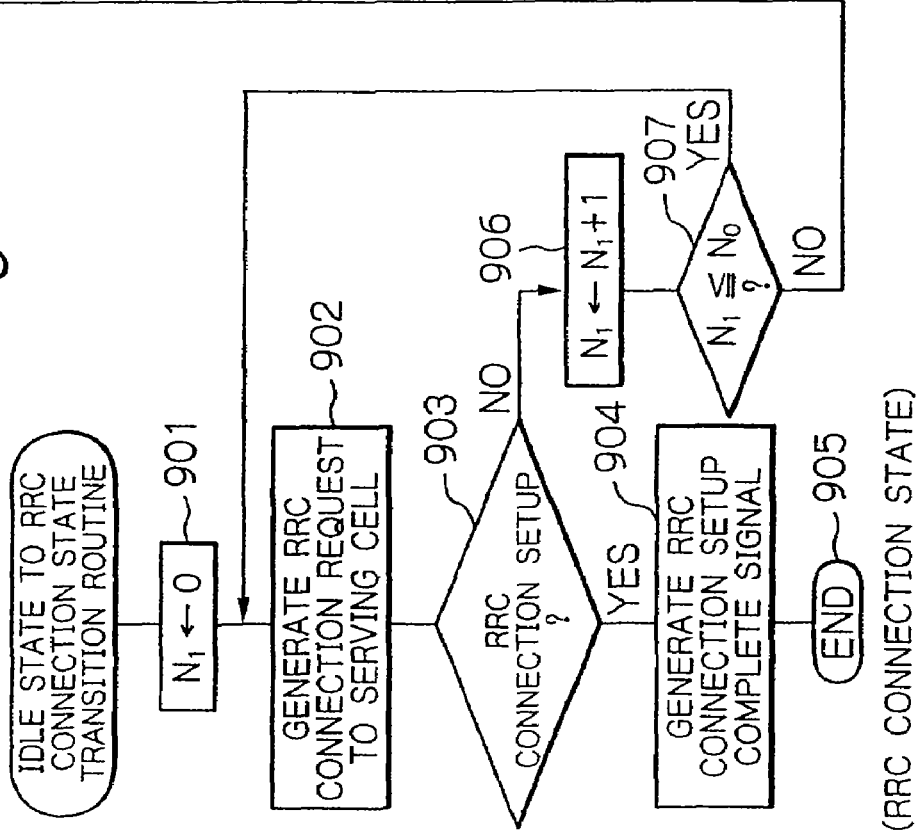
Fig. 17

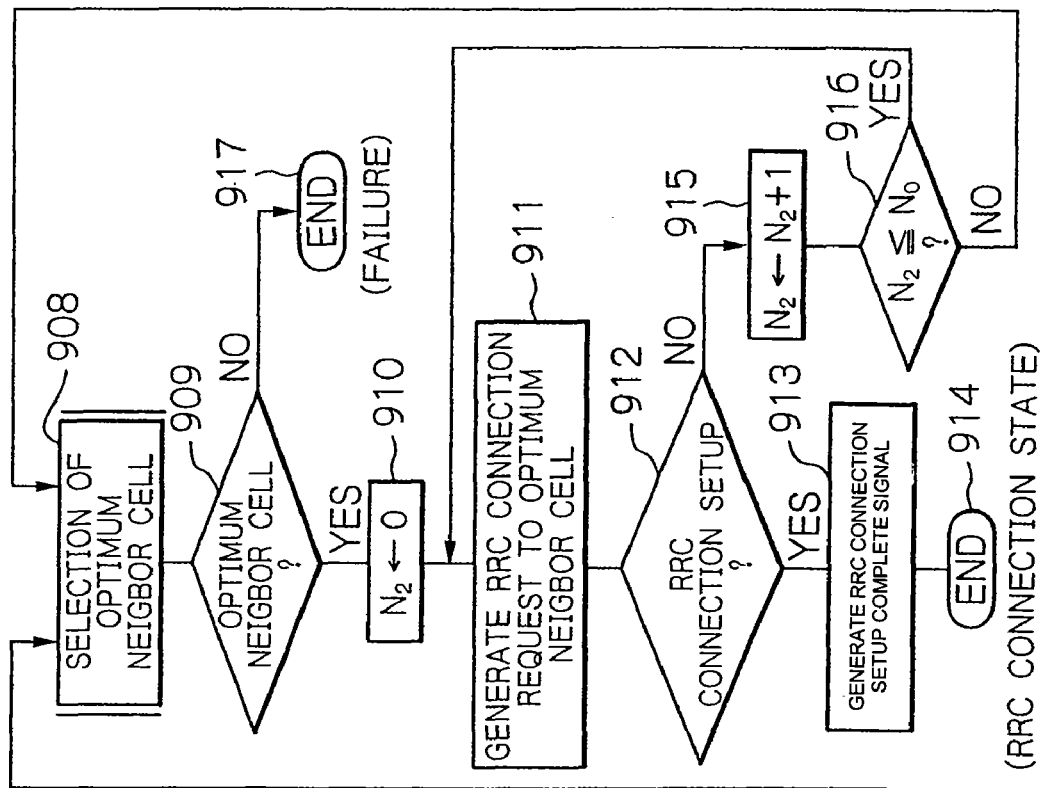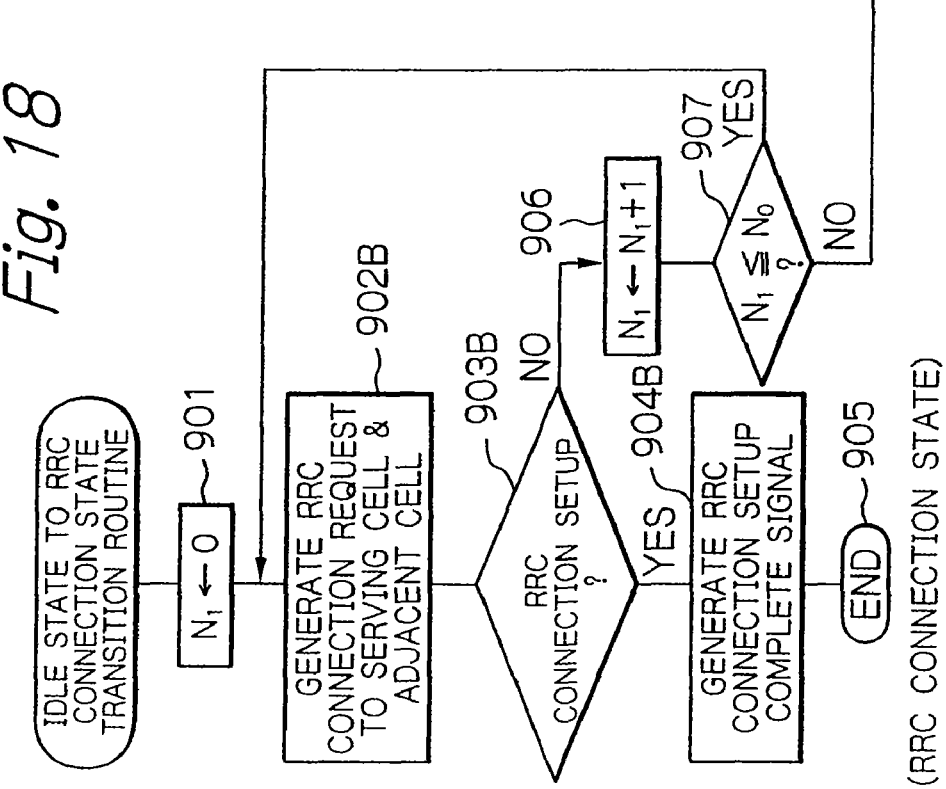
Fig. 18

MOBILE STATION, RADIO COMMUNICATION ESTABLISHING METHOD AND ITS RADIO COMMUNICATION SYSTEM

BACKGROUND OF THE INVENTION

1. Field of the Invention

The present invention relates to a mobile station capable of establishing an early radio communication connection state, a radio communication establishing method therefor, and its radio communication system.

2. Description of the Related Art

Generally, a mobile communication system includes mobile stations such as portable telephones, personal digital assistants (PDAs) or pagers, base stations, base station control stations for controlling the base stations, and a network such as the Internet or a public switched telephone network (PSTN) connected to the base station control stations.

When one mobile station receives a service such as a speech service, a packet communication service or a video telephone service, first, a radio communication connection state with one of the base stations is established, and then, this mobile station is recognized by the network. Therefore, no service is given to the mobile station before such a radio communication connection state is established.

The above-mentioned establishment of a radio communication connection state is carried out:

1) when the mobile station is switched ON or a user identity module (UIM card) or an integrated circuit (IC) card according to the 3rd Generation Mobile Telephone System is inserted thereinto to thus register the location;

2) when a cell transfer processing (handover) for changing a serving base station to its neighbor base station is expected;

3) when a handover between base stations of different systems is expected; and 4) when an intermittent reception or a sleep mode reception has completed.

Note that a cell is defined by a service area of one base station. Also, a serving cell is a cell where a mobile station is located and is currently or will communicate with the base station for this cell. Further, a neighbor cell is a cell located at the periphery of the serving cell.

In a first prior art mobile communication system (see: JP-4-344723-A), when a traffic overload occurs in the cell of one base station, the base station control station thereof reports to the network a mobile station having largest difference in received electric field strength in a memory in which the differences of received electric field strengths of radio signals from the base station and its neighbor base stations are stored. As a result, such a mobile station is selected as a candidate to be handed over, and is subject to a forced handover. Thus, the degradation of speech qualities of mobile stations can be suppressed.

In a second prior art radio communication system (see: JP-8-223110-A), in the case of occurrence of a data error, when the cause of the data error is interference, the radio channel is switched to another channel. When the cause of the data error is the collision of packets, data retransmission in a packet collision resolution mode is carried out. When the received electric field strength of a desired radio signal is lower than a predetermined value, it is determined that the distance between the mobile station and the base station is too large, so that a handover is performed upon the mobile station.

In a third prior art radio communication system (see: JP-10-12683 0-A), when the propagation environment of radio signals from a base station rapidly fluctuates, a mobile station receiving the radio signals from this base station immediately searches for neighbor cells and reports the speech qualities thereof to the network, thus carrying out a soft handover.

In a fourth prior art radio communication system (see: JP-11-289289-A), a mobile station continuously measures an electric field strength of its serving cell and electric field strengths of its neighbor cells. When the electric field strength of the serving cell is larger than a predetermined value, the mobile station stops the measurement of received electric field strengths of the neighbor cells, thus decreasing the power consumption.

In a fifth prior art radio communication system (see: JP-2002-275 19-A), the location of a mobile station is detected at every predetermined time period in accordance with a latitude and longitude of a base station for a serving cell and the latitude and longitudes of its neighbor base stations. When a handover is required, the moving direction and moving speed of the mobile station are determined in accordance with the above-mentioned information of the base station for the serving cell and its neighbor base stations to find a handover candidate from the neighbor base stations, thus enhancing the speech quality and decreasing the power consumption.

In a sixth prior art radio communication system (see: 3 GPP Organization Partners, Technical Specification "3 GPP TS 25.304 V3.12.0", pp. 1-40, December 2002, URL: http://www.3gpp.org/ftp/specs/html-info/25304.htm), a wideband code division multiple access (WCDMA) system, a radio resource connection (RRC), a cell selection from an idle mode and a cell reselection in a control mode are disclosed.

On the other hand, a mobile station establishes a radio communication connection state with a base station having the strongest electric field strength. Such an establishing process depends upon a technical specification of the radio communication system; however, this establishing process is generally carried out by exchanging special messages.

When the above-mentioned special messages are missing on the way from the mobile station to the base station or vice versa, due to the fast moving speed of the mobile station, the situation of a street the mobile station is moving on or the fluctuation of propagation environment of radio signals, message retransmission or cell reselection is carried out. Note that, after a special paging message for establishing a radio communication connection state is transmitted from the mobile station to the base station and no response message is returned from the base station to the mobile station, a message retransmission may be carried out to retrains the same paging message and a cell reselection may be carried out to change a destinated base station of the special paging message to another base station.

However, it is not effective to continue the message retransmission for the base station from which the received electric field strength is decreased. That is, the radio resource is consumed. Also, when the number of message retransmissions is increased, it will take a longer time to start a service.

Also, in the cell reselection, it will take a longer time to change from one base station for a serving cell to another. Further, since the cell reselection is often carried out after the number of message retransmission is larger than a predetermined value, it will take a further longer time to start a service.

The above-described first, second, third, fourth, fifth and sixth prior art radio communication systems have nothing to do with the delay of start of a service due to the message retransmission and the cell reselection.

SUMMARY OF THE INVENTION

It is an object of the present invention to provide a mobile station, a radio communication establishing method and its radio communication system capable of reestablishing an early radio communication connection state, which would suppress the waste of radio resources and the increase of power consumption.

According to the present invention, in a mobile station, a radio section is adapted to communicate with a plurality of base stations, and a control section is connected to the radio section. The control section is adapted to search for cells of the base stations to obtain broadcast information of radio signals of the base stations received by the radio section, select a serving cell of a specified one of the base stations and neighbor cells of other ones of the base stations neighbor to the serving cell in accordance with communication qualities of the radio signals of the base stations, and to set the serving cell and the neighbor cells in a communication connection preparing state.

BRIEF DESCRIPTION OF THE DRAWINGS

The present invention will be more clearly understood from the description set forth below, with reference to the accompanying drawings, wherein:

FIG. 9 is a flowchart for explaining the operation of the control section of FIG. 2 in the radio resource control (RRC) connection state of FIG. 5;

FIGS. 10, 11, 12, 13 and 14 are a sequence diagrams for supplementing the explanation of the operation of FIG. 9;

FIGS. 17 and 18 are flowcharts illustrating first and second modifications, respectively, of the flowchart of FIG. 9.

DESCRIPTION OF THE PREFERRED EMBODIMENT

Figure 1:
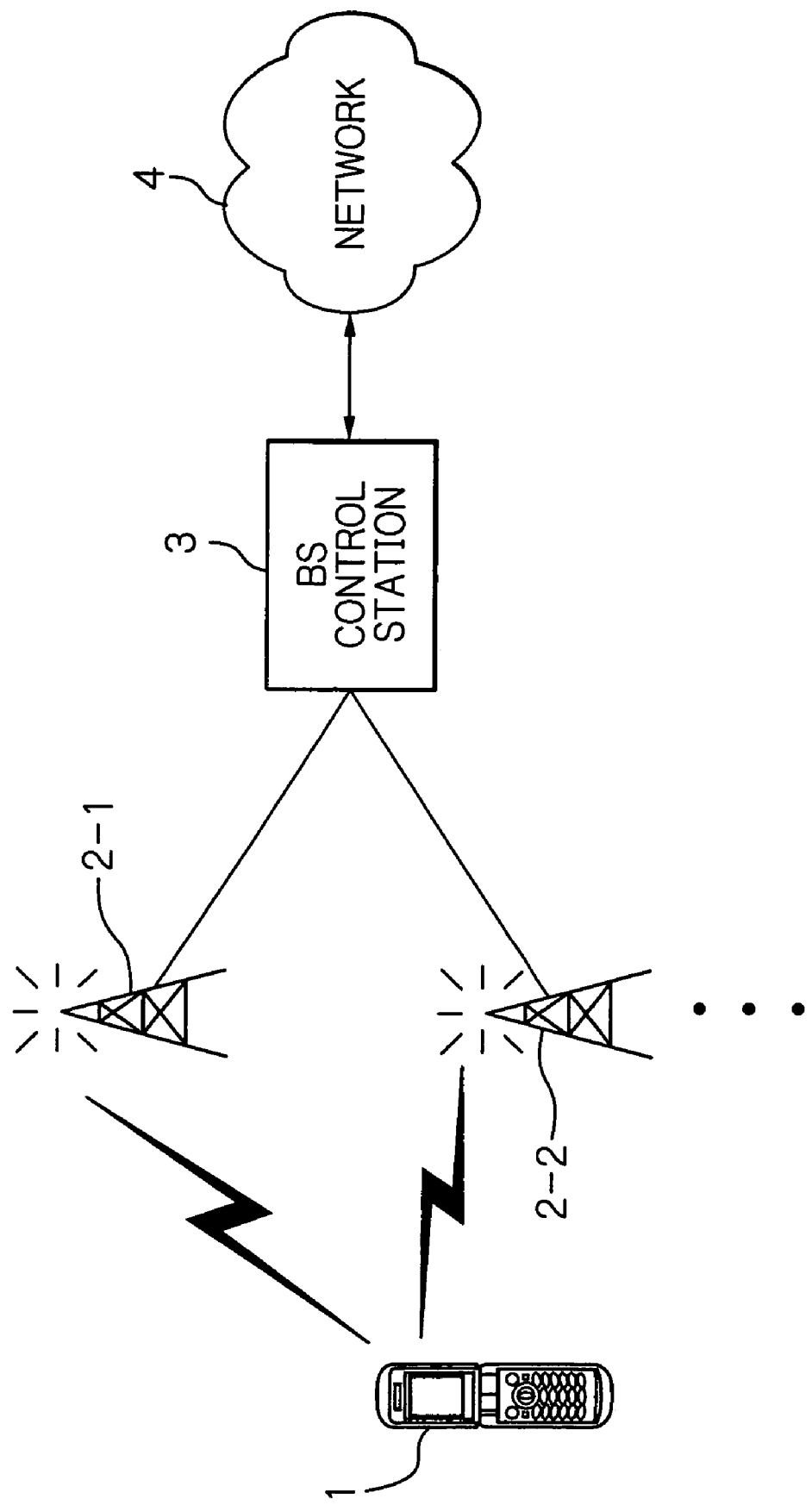
FIG. 1 is a diagram illustrating an embodiment of the mobile communication system according to the present invention.

In FIG. 1, which illustrates an embodiment of the mobile communication system according to the present invention, a mobile station 1 is located within service areas or cells of base stations 2-1, 2-2, . . . , so that the mobile station 1 can communicate with the base stations 2-1, 2-2, . . . . The base stations 2-1, 2-2, . . . are connected to a base station control station 3 which is also connected to a switching network 4 such as the Internet or a public switched telephone network (PSTN).

The base station control station 3 supervises the mobile station 1 and the base stations 2-1, 2-2, . . . .

The mobile station 1 can obtain cell broadcast information from each of the base stations 2-1, 2-2, . . . .

When the mobile station 1 carried out a radio communication service, the mobile station 1 needs to communicate with the base station control station 3 through one of the base stations 2-1, 2-2, . . . . In this case, a physical communication state needs to be established between the mobile station 1 and one of the base stations 2-1, 2-2, . . . , and a logical communication needs to be established between the mobile station 1 and the base station control station 3. As a result, the mobile station 1 is connected to the network 4.

Figure 2:
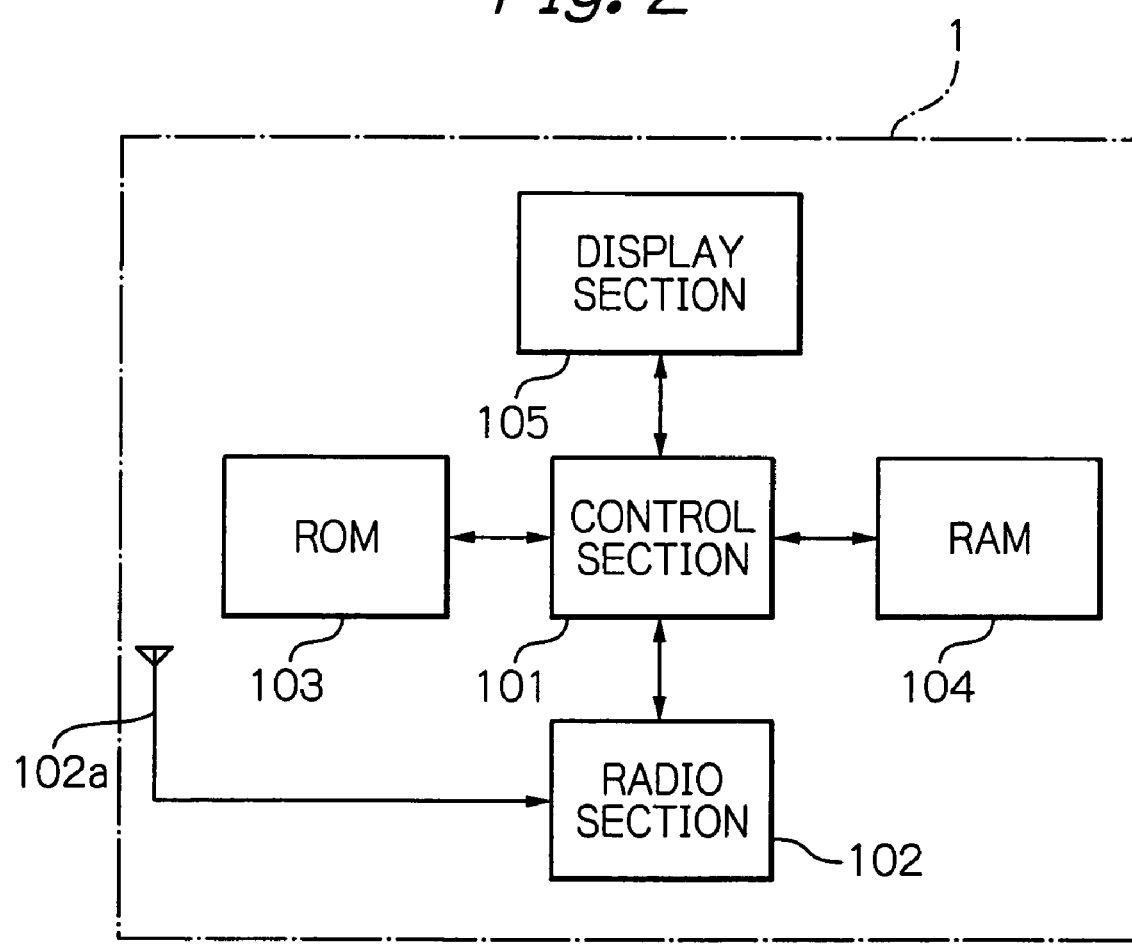
FIG. 2 is a detailed block circuit diagram of the mobile station of FIG. 1.

In FIG. 2, which is a detailed block circuit diagram of the mobile station 1 of FIG. 1, the mobile station 1 is constructed by a control section 101, a radio section 102 associated with an antenna 102a, a read-only memory (ROM) or a flash memory 103 for storing programs, constants and the like, a random access memory (RAM) 104 for storing temporary data, and a display section 105 formed by a liquid crystal display (LCD) unit or an organic electroluminescence (EL) display unit.

Figure 3:
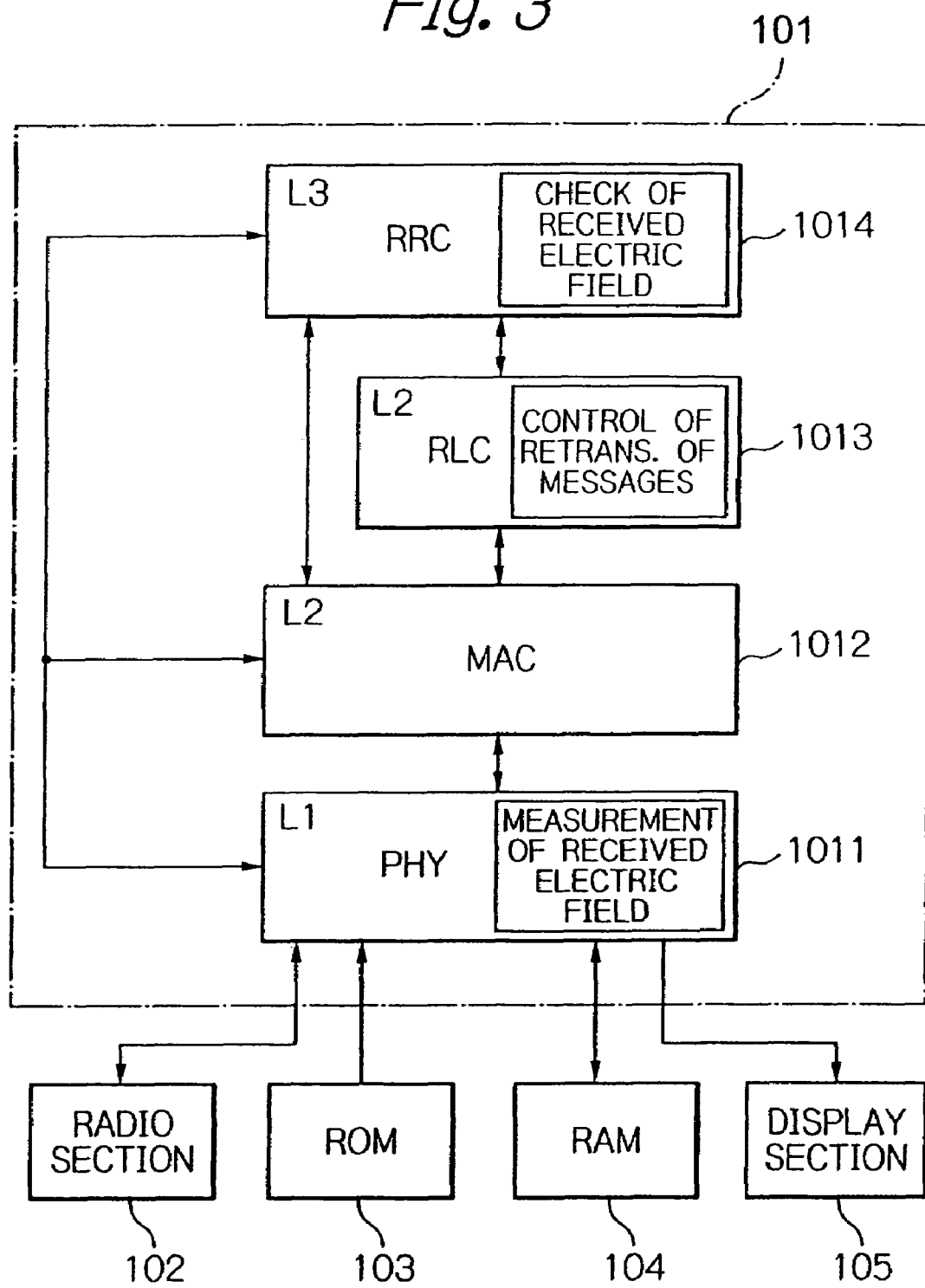
FIG. 3 is a detailed block circuit diagram of the control section of FIG. 2.

In FIG. 3, which is a detailed block circuit diagram of the control section 101 of FIG. 2, the control section 101 is constructed by a physical (PHY) layer control unit 1011, a medium access control (MAC) unit 1012, a radio/link control (RLC) unit 1013 and a radio resource control (RRC) unit 1014. The functions of the PHY layer control unit 1011, the MAC unit 1012, the RLC unit 1013 and the RRC unit 1014 are described in the above-mentioned Technical Specification "3GPP, TS25, 301".

Particularly, the PHY layer control unit 1011 provides a service for the MAC unit 1012 by using a transport channel (not shown). Also, the PHY layer control unit 1011 is adapted to monitor measurements of electric fields of radio signals from each of the base stations 2-1, 2-2, . . . in accordance with radio signals supplied to the radio section 102.

The MAC unit 1012 transforms a logic channel of its upper layer into a transport channel, and has a correspondence function between the mobile station 1 and the base station control station 3.

The RLC unit 1013 controls retransmission of messages. The RRC unit 1014 checks monitored measurements of electric fields of radio signals from each of the base stations 2-1, 2-2, . . . . Also, the RRC unit 1014 carries out an establishment procedure of a radio communication connection state.

Figure 4:
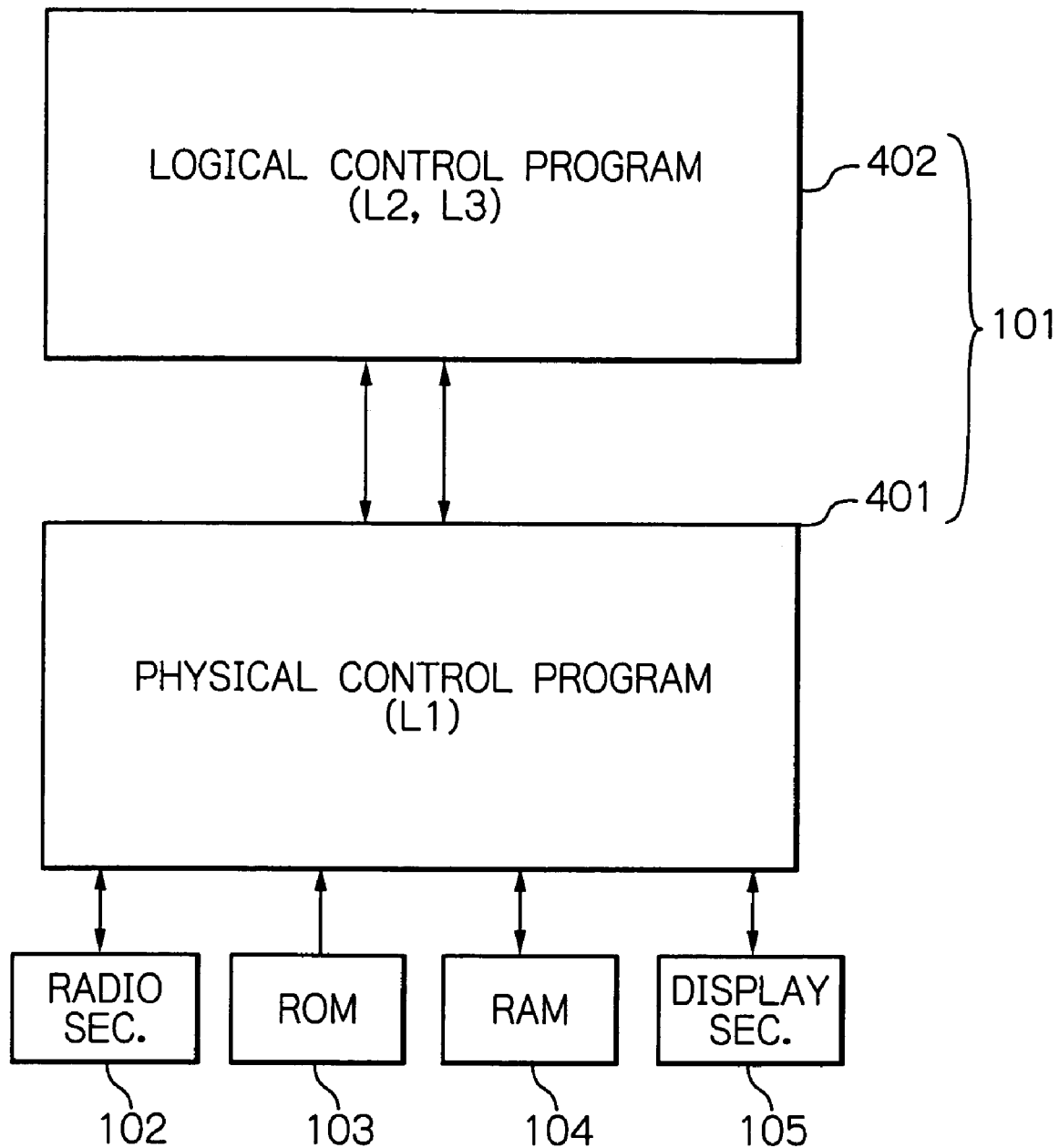
FIG. 4 is a block diagram for explaining control programs used in the control section of FIG. 3.

The PHY layer control unit 1011 is called "Layer 1 (L1)", the MAC unit 1012 and the RLC unit 1013 are called "Layer 2 (L2)", and the RRC unit 1014 is called "Layer 3 (L3)". In this case, as illustrated in FIG. 4, the PHY layer control unit 1011 is operated by a physical control program 401, the MAC unit 1012, the RLC unit 1013 and the RRC unit 1014 are operated by a logic control program 402.

Figure 5:
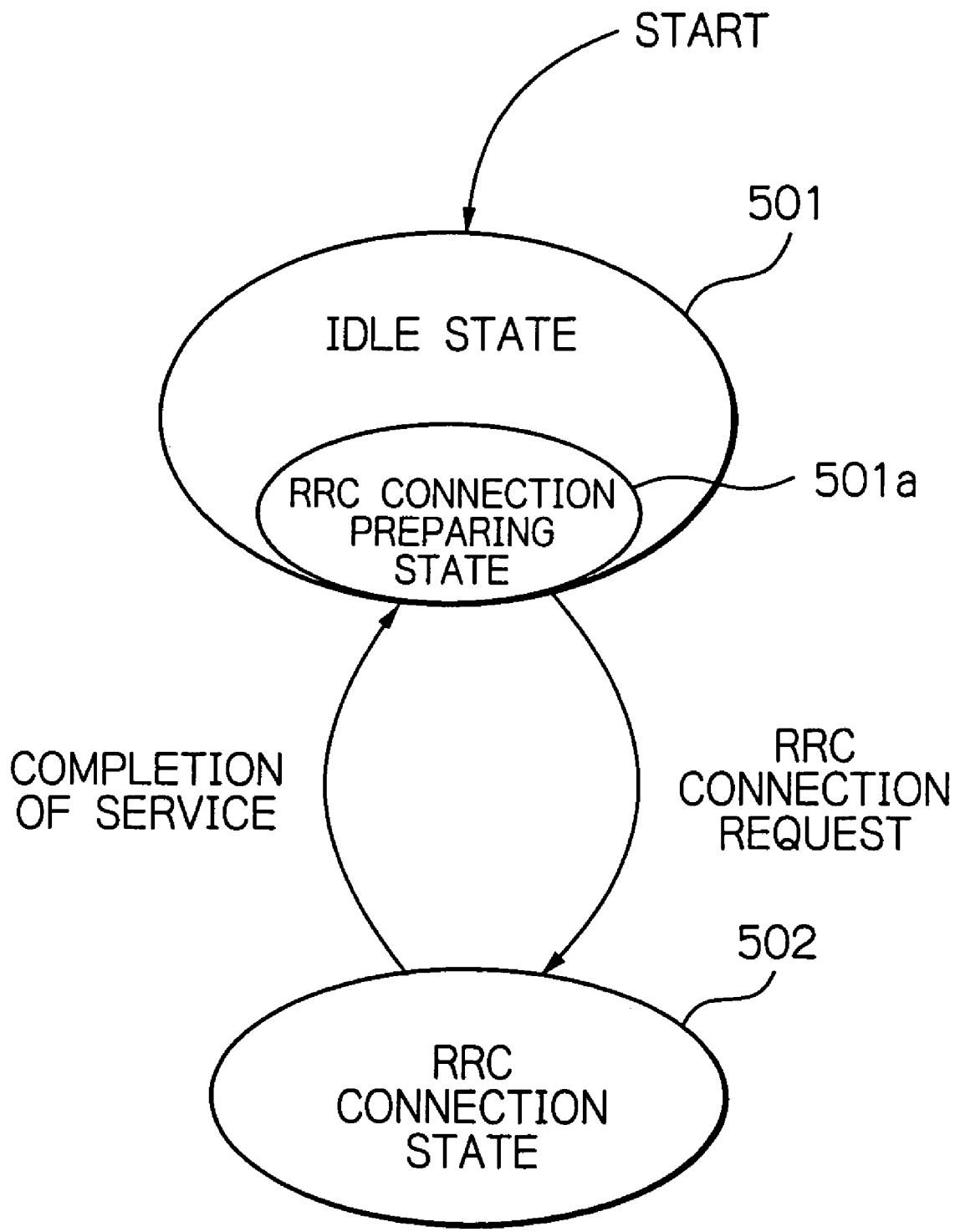
FIG. 5 is a state transition diagram for explaining the operation of the control section of FIG. 2.

In FIG. 5, which is a state transition diagram for explaining the operation of the control section 101 of FIG. 2, when the mobile station 1 is switched ON to register the location, when a UIM card or an IC card is inserted thereinto to register the location, when a handover is expected, or when an intermittent reception or a sleep mode reception has completed, the control enters an idle state 501 where the base station control station 3 does not recognize the mobile station 1; however, the mobile station 1 can receive broadcast information from the base stations 2-1, 2-2, . . . by reading primary common control physical channels (P-CCPCHs) thereof.

In the idle state 501, the mobile station 1 establishes a radio resource control (RRC) connection preparing state in accordance with the broadcast signals from the base stations 2-1, 2-2, . . . . That is, the mobile station 1 searches for cells of the base stations 2-1, 2-2, . . . by receiving the broadcast signals thereof to capture a synchronization channel (SCH) timing, a spread code, an electric field strength and the like of each of the base stations 2-1, 2-2, . . . . As a result, the mobile station 1 is logically connected to the base stations 2-1, 2-2, . . . .

In the RRC connection preparing state 501a, when a radio resource control (RRC) connection request occurs, the RRC connection preparing state 501a is transferred to a radio resource control (RRC) connection state 502 where the mobile station 1 is physically connected to the base stations 2-1, 2-2, . . . .

In the RRC connection state 502, when a service is completed, the RRC connection state 502 is returned to the idle state 501.

The idle state operation of the control section 101 of FIG. 2 is explained next with reference to FIGS. 6, 7 and 8.

Figure 6:
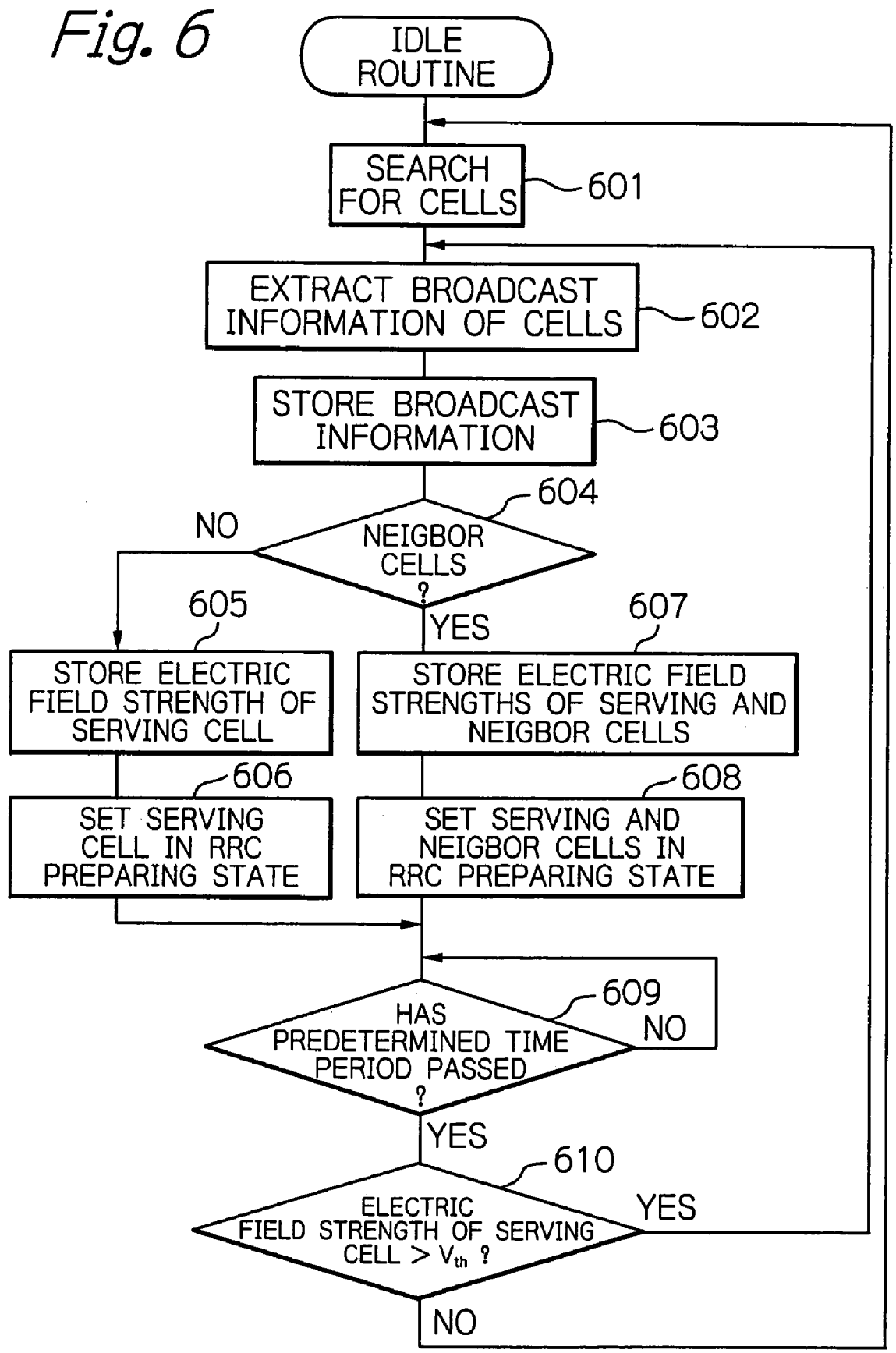
FIG. 6 is a flowchart for explaining the operation of the control section of FIG. 2 in the idle state of FIG. 5.

FIG. 6 is a flowchart for explaining the operation of the control section 101 of FIG. 2 in the idle state 501 of FIG. 5. The flowchart of FIG. 6 is started when the mobile station 1 is switched ON, when a UIM card or an IC card is inserted thereinto, when a handover is expected, or when an intermittent reception or a sleep mode reception has completed.

First, at step 601, a cell search operation for searching for cells of the base stations 2-1, 2-2, . . . is carried out. That is, when the control section 101 receives radio signals of the base stations 2-1, 2-2, . . . , the control section 101 captures synchronization signals therefrom and identifies their spread codes by using the synchronization signals.

Next, at step 602, the control section 101 extracts broadcast information from the radio signals (P-CCPCH) of the base stations 2-1, 2-2, . . . by using their inverse spread codes. As a result, some of the base stations 2-1, 2-2, . . . can be recognized. In this case, a cell of an optimum one of the recognized base stations such as the base station 2-1 is defined as a serving cell, and cells of the other recognized base stations such as the base station 2-2 are defined as neighbor cells.

At step 602, the broadcast information of the neighbor cells can be extracted from the radio signal (P-CCPCH) of the base station 2-1 of the serving cell or directly from the radio signals (P-CCPCH) of the other base stations of the neighbor cells per se.

Next, at step 603, the broadcast information extracted at step 602 is stored in the RAM 104.

Next, at step 604, it is determined whether there is at least one neighbor cell. As a result, if there is no neighbor cell, the control proceeds to steps 605 and 606, while, if there are neighbor cells, the control proceeds to steps 607 and 608.

At step 605, the control section 101 measures an electric field strength in the received radio signal (P-CCPCH) of the base station 2-1 and stores it in the RAM 104. Note that this electric field strength shows the communication quality of the received radio signal of the base station 2-1.

Next, at step 606, the control section 101 sets the serving of the base station 2-1 in an RRC connection preparing state.

On the other hand, at step 607, the control section 101 measures not only an electric field strength in the received radio signal (P-CCPCH) of the base station 2-1 but electric field strengths in the received radio signals (P-CCPCHs) of the other base stations such as the base station 2-2, and stores them in the RAM 104. Note that the electric field strengths show the communication qualities.

Next, at step 608, the control section 101 sets the serving cell of the base station 2-1 and the neighbor cells of the other base stations in an RCC connection preparing state.

Next, at step 609, it is determined whether or not a predetermined time period has passed. Only when the predetermined time period has passed, does the control proceed to step 610.

At step 610, it is determined whether or not the electric field strength of the serving cell is larger than a threshold value $V_{th}$, i.e., it is determined whether or not the mobile station 1 can communicate with the base station 2-1 for the serving cell. Only when the mobile station 1 can communicate with the base station 2-1 for the serving cell, is the control at steps 602 to 609 repeated. Otherwise, the control at steps 601 to 610 is repeated.

Note that, even at any step of FIG. 6, in the event that a handover, completion of an intermittent reception or a sleep mode reception or the like has occurred, the operation of the flowchart of FIG. 6 is completed.

Also, in FIG. 6, step 609 can be moved to a location after step 602, 603, 605 or 607.

Figure 7:
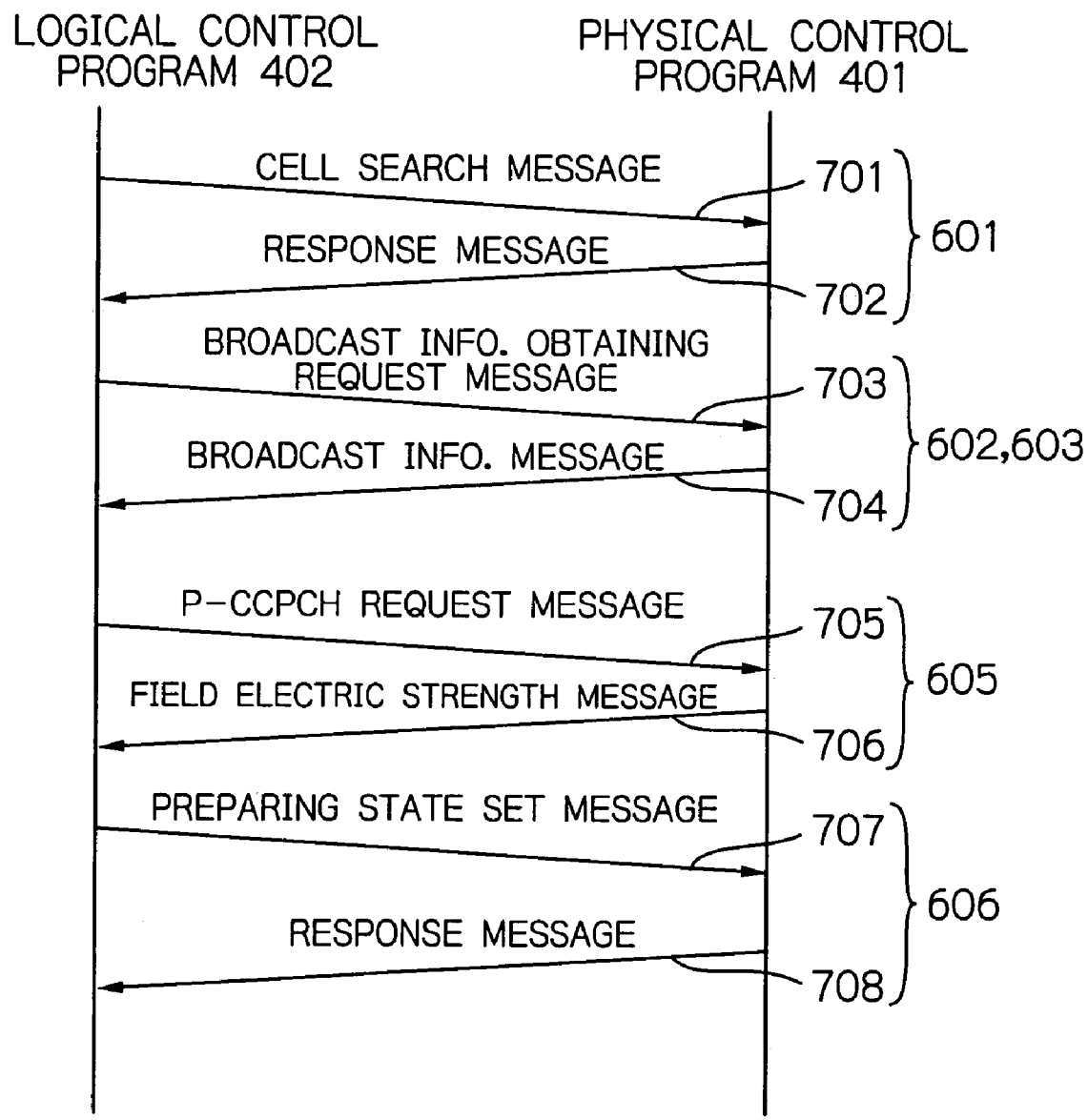
FIGS. 7 and 8 are sequence diagrams for supplementing the operation of FIG. 6 and show the operation between the physical control program 401 and the logical control program 402 of FIG. 4.
Figure 8:
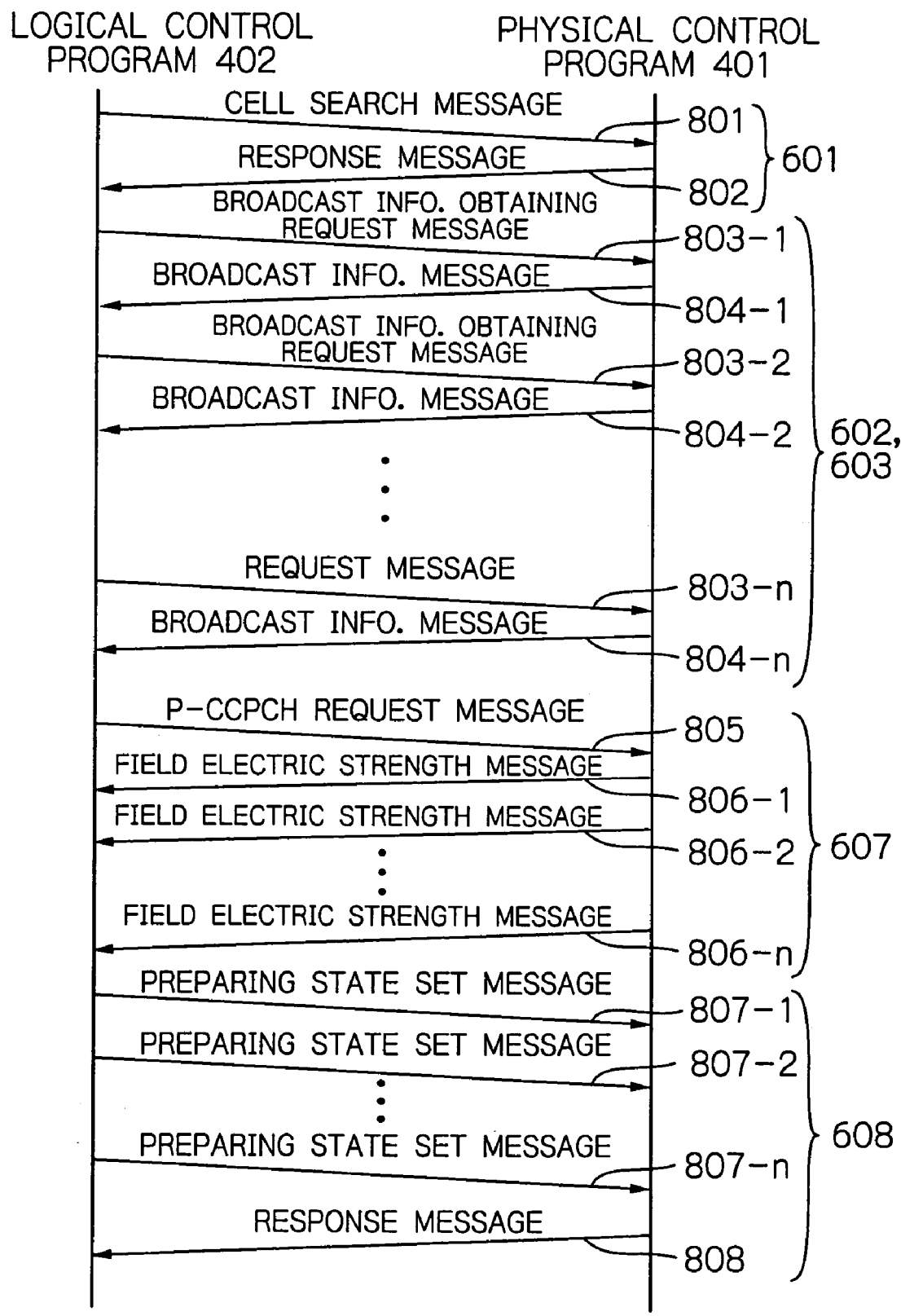

The operation of FIG. 6 is supplemented by sequence diagrams of FIGS. 7 and 8 which show an operation between the physical control program 401 and the logical control program 402 of FIG. 4.

The sequence diagram of FIG. 7 supplements steps 601, 602, 603, 605 and 606 of FIG. 6.

First, as indicated by steps 701 and 702 which correspond to step 601 of FIG. 6, the logical control program 402 generates a cell search message and transmits it to the physical control program 401. As a result, the physical control program 401 performs a cell search operation upon the radio signals from the base stations 2-1, 2-2, . . . , and returns response messages to the logical control program 402.

Next, as indicated by steps 703 and 704 which correspond to steps 602 and 603 of FIG. 6, the logical control program 402 generates a broadcast information request message and transmits it to the physical control program 401. As a result, the physical control program 401 returns a broadcast information message extracted from the radio signals (P-CCPCHs) of the base stations 2-1, 2-2, . . . , to the logic control program 402. Then, the extracted broadcast information is stored in the RAM 104.

Next, as indicated by steps 705 and 706 which correspond to step 605 of FIG. 6, the logical control program 402 generates a P-CCPCH request message and transmits it to the physical control program 401. As a result, the physical control program 401 measures an electric field strength in the received radio signal (P-CCPCH) of the base station 2-1 and returns a message including the electric field strength to the logical control program 402. As a result, this electric field strength is stored in the RAM 104.

Next, as indicated by steps 707 and 708, the logical control program 402 generates an RRC connection preparing state set message and transmits it to the physical control program 401. As a result, the physical control program 401 returns a response message to the logical control program 402.

Thus, the mobile station 1 can always transmit an RRC connection request to the base station 2-1 for the serving cell. Also, the electric field strength of the serving cell of the base station 2-1 is sequentially stored in the RAM 104 on the basis of time.

The sequence diagram of FIG. 8 supplements steps 601, 602, 603, 607 and 608 of FIG. 6.

First, as indicated by steps 801 and 802 which correspond to step 601 of FIG. 6, the logical control program 402 generates a cell search message and transmits it to the physical control program 401. As a result, the physical control program 401 performs a cell search operation upon the radio signals from the base stations 2-1, 2-2, ..., and returns response messages to the logical control program 402.

Next, as indicated by steps 803-1, 804-1, 803-2, 804-2, ..., 803-n, 804-n which correspond to steps 602 and 603 of FIG. 6, the logical control program 402 generates a plurality of broadcast information request messages and transmits them to the physical control program 401. As a result, the physical control program 401 returns a plurality of broadcast information messages extracted from the radio signals (P-CCPCHs) of the base stations 2-1, 2-2, ..., to the logic control program 402. Then, the extracted broadcast information is stored in the RAM 104.

Next, as indicated by steps 805, 806-1, 806-2, ..., 806-n which correspond to step 607 of FIG. 6, the logical control program 402 generates a P-CCPCH request message and transmits it to the physical control program 401. As a result, the physical control program 401 measures electric field strengths in the received radio signals (P-CCPCHs) of the base stations 2-1, 2-2, ..., and returns messages including the electric field strengths to the logical control program 402. As a result, the electric field strengths are stored in the RAM 104.

Next, as indicated by steps 807-1, 807-2, ..., 807-n and 808, the logical control program 402 generates a plurality of RRC connection preparing state set messages and transmits them to the physical control program 401. As a result, the physical control program 401 returns a response message to the logical control program 402.

Thus, the mobile station 1 can always transmit RRC connection requests to the base station 2-1 for the serving cell as well as the base station 2-2, ... for the neighbor cells. Also, the electric field strengths of the serving cell of the base station 2-1 and the neighbor cells of the base stations 2-2, ... are sequentially stored in the RAM 104 on the basis of time.

FIG. 9 is a flowchart for explaining the operation of the control section 101 of FIG. 2 in the idle state to the RRC connection state transition operation of FIG. 5. The flowchart of FIG. 9 is started when an RRC connection request such as a handover or a completion of an intermittent reception or a sleep mode reception occurs.

First, at step 901, a retransmission counter value $N_1$ is reset, i.e., $N_1 \leftarrow 0$.

Next, at step 902, the control section 101 generates an RRC connection request signal and transmits it via the base station 2-1 for the serving cell to the base station control station 3.

Figure 10:
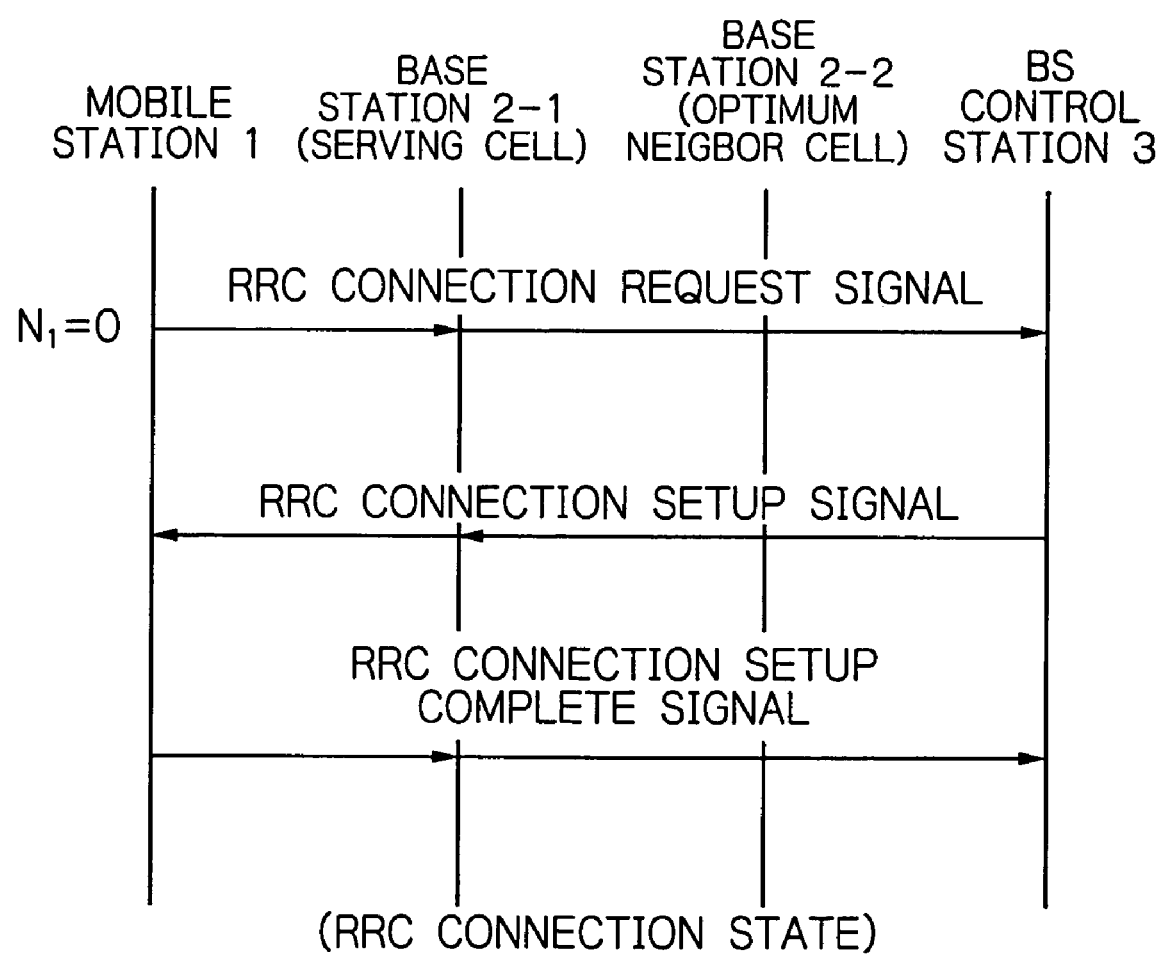

Next, at step 903, it is determined whether or not an RRC connection setup signal has been received via the base station 2-1 from the base station control section 3 within a predetermined time period. Only when such an RRC connection setup signal has been received, does the control proceed to step 904 which generates an RRC connection setup complete signal and transmits it via the base station 2-1 to the base station control station 3, thus establishing an RRC connection state 502 of FIG. 5 at step 905. This procedure is shown in a sequence diagram of FIG. 10. Otherwise, the control proceeds to step 906.

At step 906, the retransmission counter value $N_1$ is increased by 1, i.e., $N_1 \leftarrow N_1 + 1$. Then, at step 907, it is determined whether or not $N_1 \leq N_0$, where $N_0$ is a reference value such as 1, 2, ..., is satisfied. For example, assume that $N_0 = 1$. Only when $N_1 \leq N_0$, is the control at steps 902 to 906 repeated.

Figure 11:
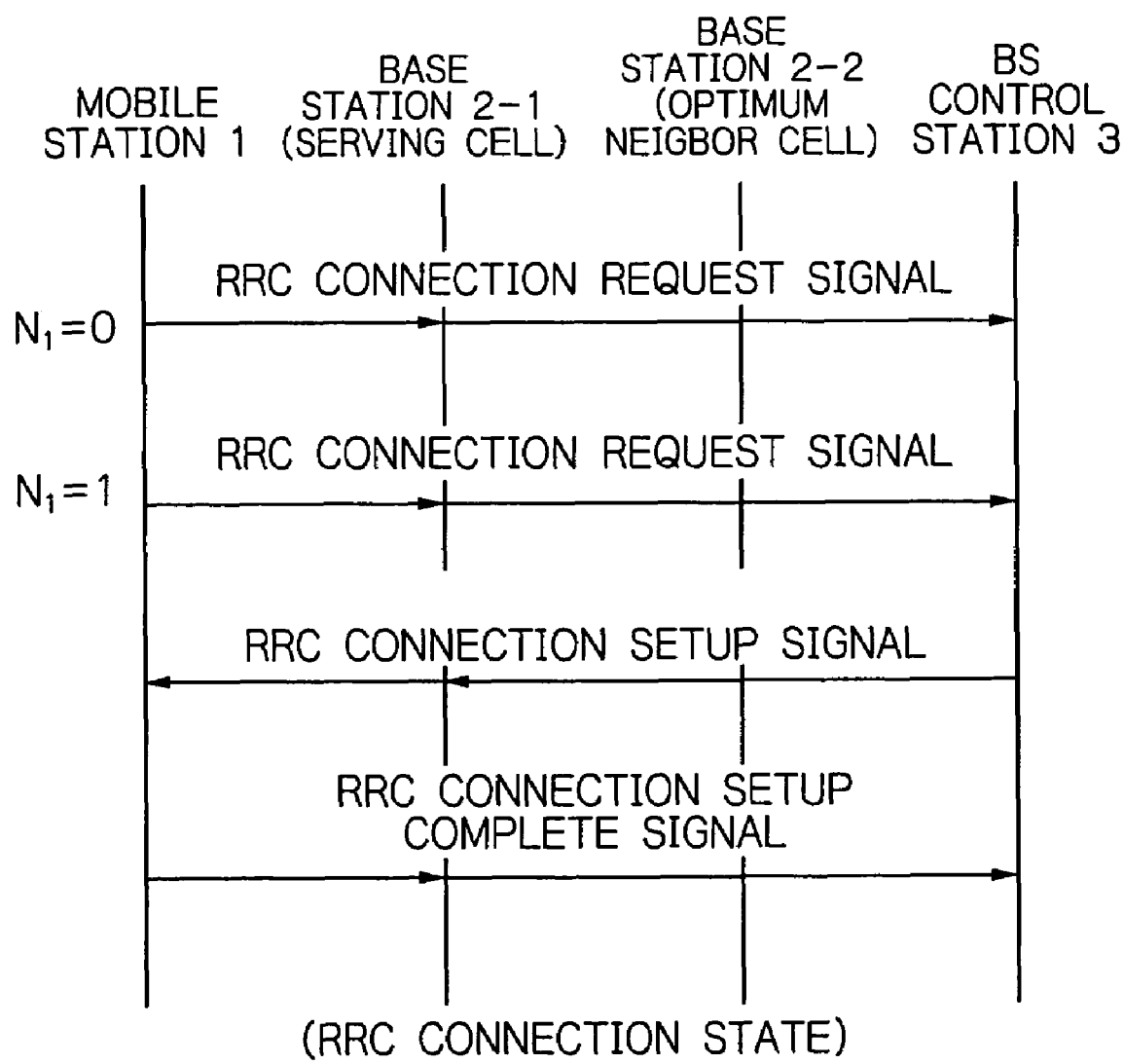

After the control at steps 902 to 905 is repeated, if an RRC connection state 502 of FIG. 2 is established at step 905, the procedure as shown in a sequence diagram of FIG. 11 is carried out.

After the control steps 902, 903, 906 and 907, when $N_1 \leq N_0$ is not satisfied, the control at step 907 proceeds to step 908.

At step 908, an optimum neighbor cell to the serving cell of the base station 2-1 is selected. This will be explained later in detail. Then, at step 909, it is determined whether or not there is such an optimum neighbor cell. Only when there is such an optimum neighbor cell such as a cell of the base station 2-2, does the control proceed to step 910.

At step 910, a retransmission counter value $N_2$ is reset, i.e., $N_2 \leftarrow 0$.

Next, at step 911, the control section 101 generates an RRC connection request signal and transmits it via the base station 2-2 for the optimum neighbor cell to the base station control station 3.

Figure 12:
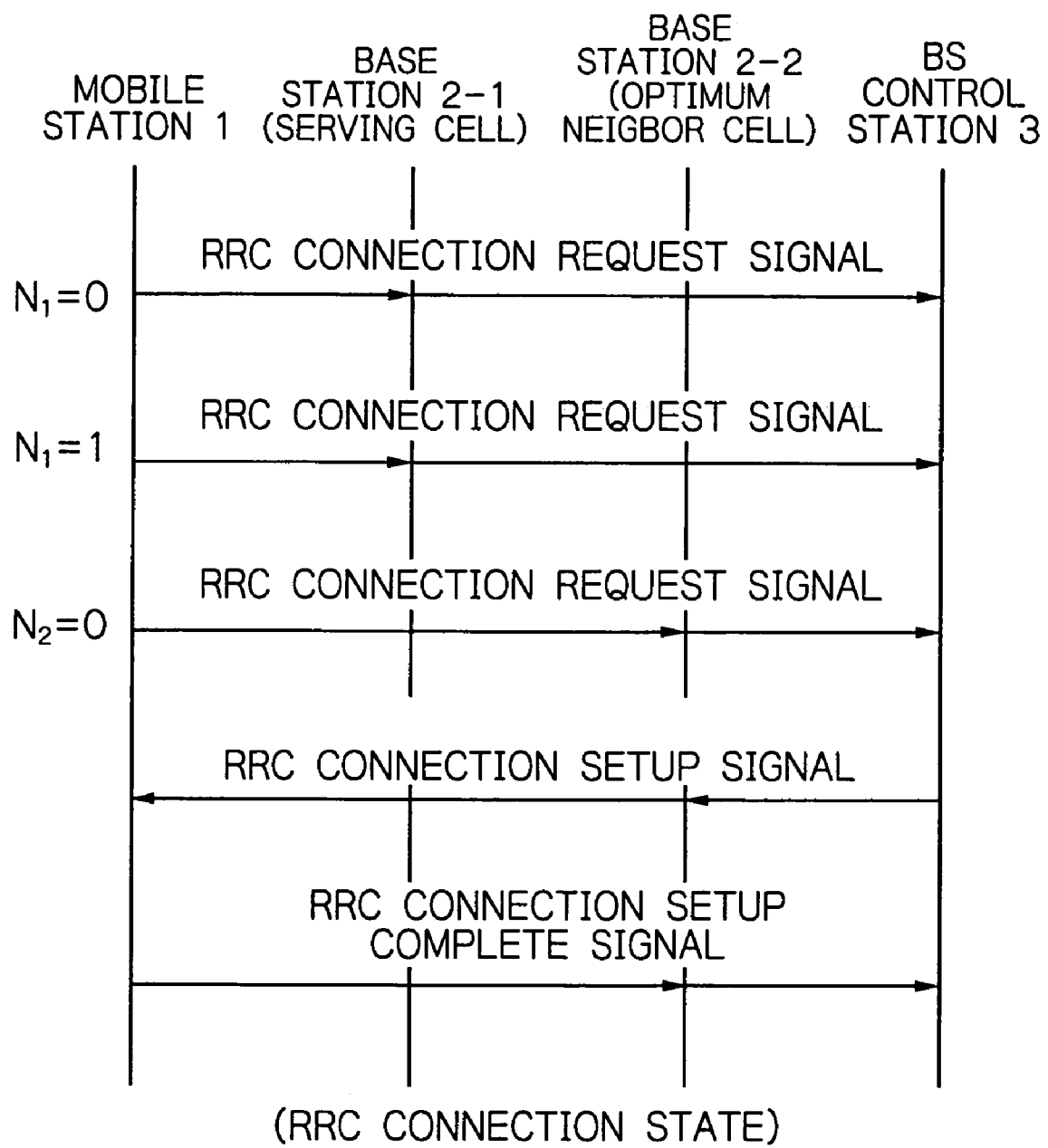

Next, at step 912, it is determined whether or not an RRC connection setup signal has been received via the base station 2-2 from the base station control section 3 within a predetermined time period. Only when such an RRC connection setup signal has been received, does the control proceed to step 913 which generates an RRC connection setup complete signal and transmits it via the base station 2-2 to the base station control station 3, thus establishing an RRC connection state 502 of FIG. 5 at step 914. This procedure is shown in a sequence diagram of FIG. 12. Otherwise, the control proceeds to step 915.

At step 915, the retransmission counter value $N_2$ is increased by 1, i.e., $N_2 \leftarrow N_2 + 1$. Then, at step 916, it is determined whether or not $N_2 \leq N_0$, is satisfied. Only when $N_2 \leq N_0$, is the control at steps 911 to 915 repeated.

Figure 13:
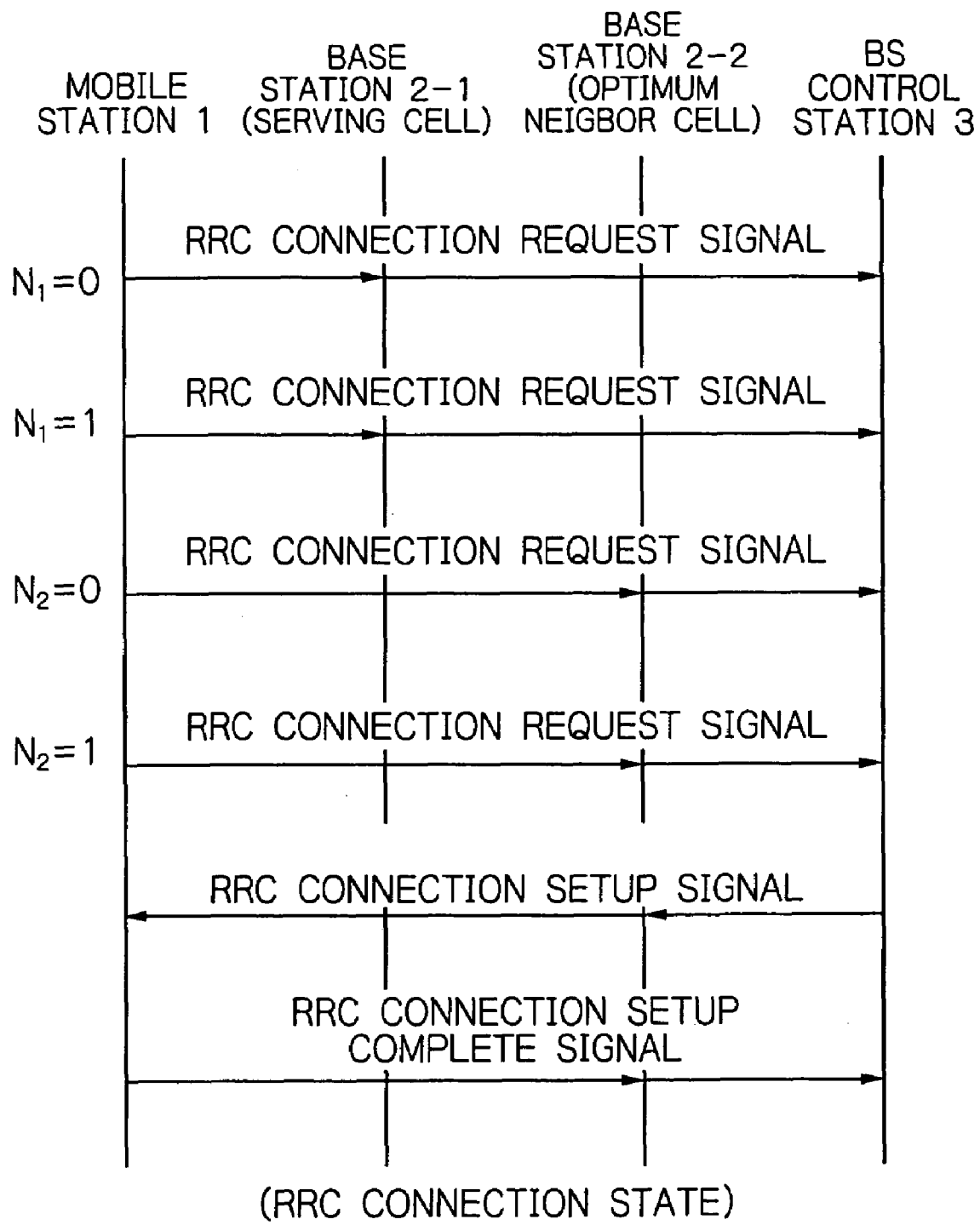

After the control at steps 911 to 914 is repeated, if an RRC connection state 502 of FIG. 2 is established at step 914, the procedure as shown in a sequence diagram of FIG. 13 is carried out.

After the control steps 911, 912, 915 and 916, when $N_2 \leq N_0$ is not satisfied, the control at step 916 proceeds to step 908.

Again at step 908, another optimum neighbor cell to the serving cell of the base station 2-1 is calculated. This will be explained later in detail. Then, at step 909, it is determined whether or not there is such an optimum neighbor cell. Only when there is such an optimum neighbor cell, does the control proceed to step 910. Otherwise, the control proceeds to step 917.

At step 917, no RRC connection state is established, i.e., a transition from the idle state 501 of FIG. 5 to the RRC connection state 502 of FIG. 5 fails. This procedure is shown in a sequence diagram of FIG. 14.

The calculation of an optimum neighbor cell at step 908 is explained next with reference to FIGS. 15A, 15B and 15C and FIGS. 16A, 16B and 16C.

Figure 15A:
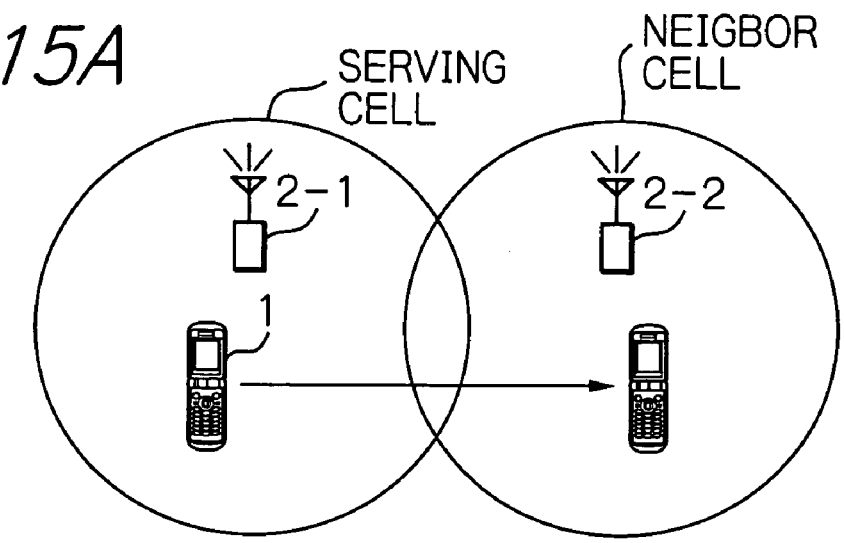
FIGS. 15A, 15B and 15C are diagrams for explaining the operation at step 908 of FIG. 9.
Figure 15B:
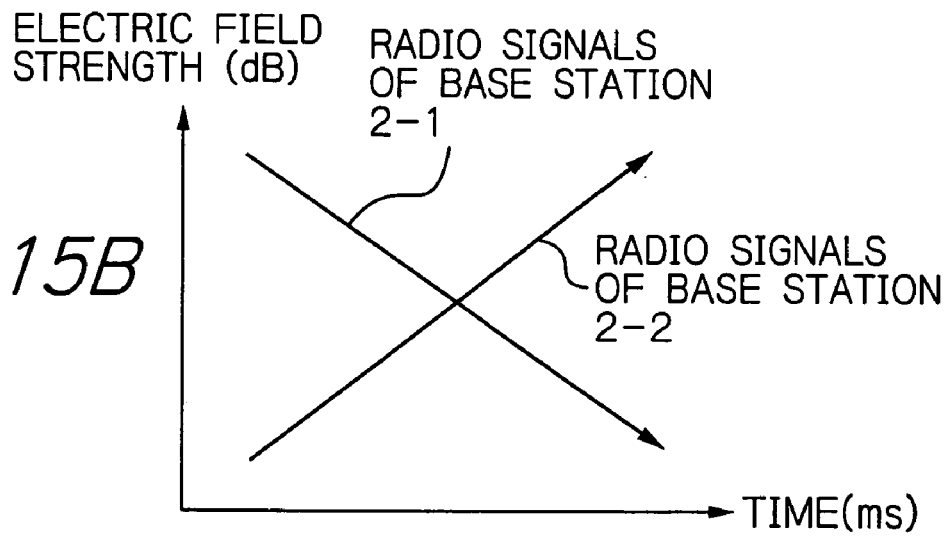
Figure 15C:
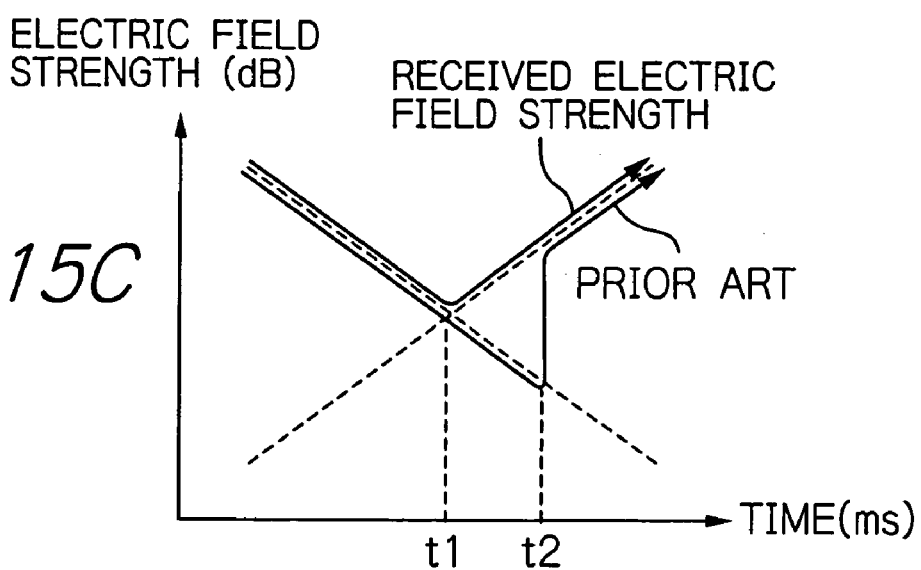

For example, as illustrated in FIG. 15A, assume that the mobile station 1 moves from the serving cell of the base station 2-1 to the cell of the base station 2-2 neighbor to the serving cell of the base station 2-1. In this case, as illustrated in FIG. 15B, the electric field strength of radio signals of the base station 2-1 received by the mobile station 1 is gradually decreased, while the electric field strength of radio signals of the base station 2-2 received by the mobile station 1 is gradually increased. The electric field strengths with respect to time (ms) as illustrated in FIG. 15B are stored in the ROM 103 in advance. On the other hand, the actual corresponding electric field strengths with respect to time (ms) are stored in the RAM 104 by steps 605 and 607 of FIG. 6. Therefore, at step 908 of FIG. 9, the actual corresponding electric field strengths of radio signals in the RAM 104 are compared with the electric field strengths of radio signals in the ROM 103 by the least square method or another algorithm, to select the neighbor cell of the base station 2-2 as an optimum neighbor cell. As a result, as illustrated in FIG. 15C, the received electric field strength of radio signals by the mobile station 1 can establish an early RRC connection state at time t1. Note that, in the prior art, an RRC connection state is established at time t2.

Figure 16A:
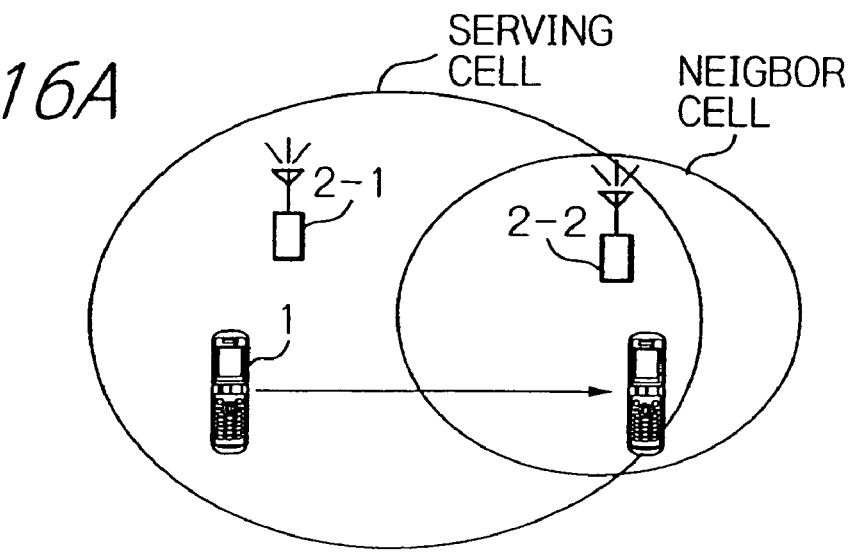
FIGS. 16A, 16B and 16C are diagrams for explaining the operation at step 908 of FIG. 9.
Figure 16B:
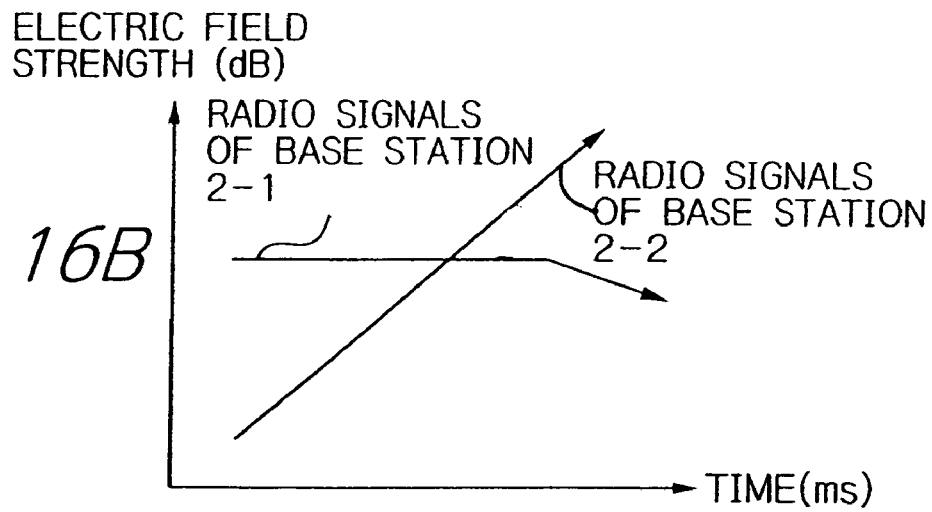
Figure 16C:
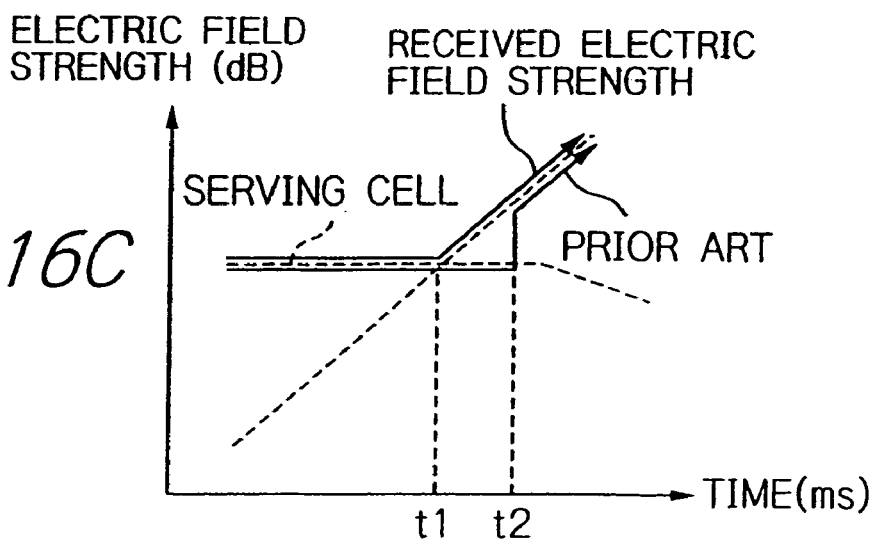

Also, as illustrated in FIG. 16A, assume that the mobile station 1 moves from the serving cell of the base station 2-1 to the cell of the base station 2-2 neighbor to the serving cell of the base station 2-1. In this case, as illustrated in FIG. 16B, the electric field strength of radio signals of the base station 2-1 received by the mobile station 1 remains at the same level and is then gradually decreased, while the electric field strength of radio signals of the base station 2-2 received by the mobile station 1 is gradually increased. The electric field strengths on the basis of time (ms) as illustrated in FIG. 16B are stored in the ROM 103 in advance. On the other hand, the actual corresponding electric field strengths on the basis of time (ms) are stored in the RAM 104 by steps 605 and 607 of FIG. 6. Therefore, at step 908 of FIG. 9, the actual corresponding electric field strengths of radio signals in the RAM 104 are compared with the electric field strengths of radio signals in the ROM 103 by the least square method or another algorithm, to select the neighbor cell of the base station 2-2 as an optimum neighbor cell. As a result, as illustrated in FIG. 16C, the received electric field strength of radio signals by the mobile station 1 can establish an early RRC connection state at time t1. Note that, in the prior art, an RRC connection state is established at time t2.

Note that, as many pairs of electric field strengths of a serving cell and its neighbor cell are stored in the ROM 103 in advance, the idle state to RRC connection state transition can be established early.

In FIG. 17, which is a first modification of the flowchart of FIG. 9, steps 911, 912 and 913 are replaced by steps 911A, 912A and 913A, respectively.

That is, at step 911A, the control section 101 generates two RRC connection request signals and transmits them via the base station 2-1 for the serving cell and the base station 2-2 for the optimum neighbor cell to the base station control station 3.

Next, at step 912A, it is determined whether or not at least one RRC connection setup signal has been received via the base stations 2-1, 2-2, ... from the base station control station 3 within a predetermined time period. Only when at least one RRC connection setup signal has been received, does the control proceed to step 913A which generates an RRC connection setup complete signal and transmits it via one of the base stations 2-1, 2-2, ... to the base station control station 3. In this case, the one of the base stations 2-1, 2-2, ... passes the RRC connection setup signal therethrough; however, when both of the base stations 2-1, 2-2, ... pass RRC connection setup signal therethrough, the RRC connection setup complete signal can be transmitted via any one of the base station 2-1, 2-2, ... to the base station control station 3.

In the flowchart of FIG. 17, an RRC connection state 502 of FIG. 5 can be more surely established as compared with the flowchart of FIG. 9.

In FIG. 18, which is a second modification of the flowchart of FIG. 9, steps 902, 903 and 904 are replaced by steps 902B, 903B and 904B, respectively.

That is, at step 902B, the control section 101 generates two RRC connection request signals and transmits them via the base station 2-1 for the serving cell and the base station 2-2 for the neighbor cell to the base station control station 3.

Next, at step 903B, it is determined whether or not at least one RRC connection setup signal has been received via the base stations 2-1, 2-2, ... from the base station control station 3 within a predetermined time period. Only when at least one RRC connection setup signal has been received, does the control proceed to step 904B which generates an RRC connection setup complete signal and transmits it via one of the base stations 2-1, 2-2, ... to the base station control station 3. In this case, the one of the base stations 2-1, 2-2, ... passes the RRC connection setup signal therethrough; however, when both of the base stations 2-1, 2-2, ... pass RRC connection setup signal therethrough, the RRC connection setup complete signal can be transmitted via any one of the base station 2-1, 2-2, ... to the base station control station 3.

In the flowchart of FIG. 18, an RRC connection state 502 of FIG. 5 can be more surely established as compared with the flowchart of FIG. 9.

The present invention can be applied to other radio communication systems than the WCDMA system. For example, in a synchronization-type CDMA system, a mobile station have only to obtain a synchronization timing of a base station for an neighbor cell. Also, in a time division multiple access (TDMA) system, a mobile station has only to obtain frequency information of a base station for an neighbor cell.

Also, the mobile station 1 can incorporate a global positioning system (GPS). In this case, at step 908 of FIGS. 9, 17 and 18, selection of an optimum neighbor cell can be carried out by comparing the location information of the mobile station 1 obtained by the GPS system with the locations of the base stations 2-1, 2-2, ... for neighbor cells.

As explained hereinabove, according to the present invention, when a communication connection request occurs, an early communication connection state can be established.

The invention claimed is:

1. A mobile station comprising:
   a radio section adapted to communicate with a plurality of base stations; and
   a control section connected to said radio section, said control section being adapted to search for cells of said base stations to obtain broadcast information of radio signals of said base stations received by said radio section, select a serving cell of a specified one of said base stations and at least one neighbor cell of other ones of said base stations neighbor to said serving cell in accordance with broadcast information of the radio signals of said base stations, transmit at least one communication connection request to said serving cell, and select an optimum neighbor cell from said neighbor cells in accordance with communication qualities of the radio signals of said base stations on the basis of time to transmit at least one communication connection request to said optimum neighbor cell, when said control section receives no response from said serving cell to said communication connection request transmitted thereto.

2. The mobile station as set forth in claim 1, wherein the communication qualities of the radio signals of said base stations received by said radio section are electric field strengths of the radio signals thereof.

3. The mobile station as set forth in claim 1, further comprising:
   a first memory adapted to sequentially store the communication qualities of the radio signals of said base stations on the basis of time; and
   a second memory adapted to store sequentially reference communication qualities of the radio signals of said base stations on the basis of time;
   wherein said control section is adapted to select said optimum neighbor cell from said neighbor cells by comparing the communication qualities of the radio signals of said base stations stored in said first memory with the reference communication qualities of the radio signals of said base stations stored in said second memory.

4. A mobile station comprising:
   a radio section adapted to communicate with a plurality of base stations; and
   a control section connected to said radio section, said control section being adapted to search for cells of said base stations to obtain broadcast information of radio signals of said base stations received by said radio section, select a serving cell of a specified one of said base stations and neighbor cells of other ones of said base stations neighbor to said serving cell in accordance with broadcast information of the radio signals of said base stations, transmit at least one communication connection request to said serving cell, and select an optimum neighbor cell from said neighbor cells in accordance with communication qualities of the radio signals of said base stations on the basis of time to transmit at least one communication connection request to said serving cell and said optimum neighbor cell, when said control section receives no response from said serving cell to said communication connection request transmitted thereto.

5. The mobile station as set forth in claim 4, further comprising:
   a first memory adapted to sequentially store the communication qualities of the radio signals of said base stations on the basis of time; and
   a second memory adapted to sequentially store reference communication qualities of the radio signals of said base stations on the basis of time;
   wherein said control section is adapted to select said optimum neighbor cell from said neighbor cells by comparing the communication qualities of the radio signals of said base stations stored in said first memory with the reference communication qualities of the radio signals of said base stations stored in said second memory.

6. The mobile station as set forth in claim 4, wherein the communication qualities of the radio signals of said base stations received by said radio section are electric field strengths of the radio signals thereof.

7. A mobile station comprising:
   a radio section adapted to communicate with a plurality of base stations; and
   a control section connected to said radio section, said control section being adapted to search for cells of said base stations to obtain broadcast information of radio signals of said base stations received by said radio section, select a serving cell of a specified one of said base stations and neighbor cells of other ones of said base stations neighbor to said serving cell in accordance with broadcast information of the radio signals of said base stations, transmit at least one communication connection request to said serving cell and one of said neighbor cells, and to select an optimum neighbor cell from said neighbor cells in accordance with communication qualities of the radio signals of said base stations on the basis of time to transmit at least one communication connection request to said optimum neighbor cell, when said control section receives no response from said serving cell and the one of said neighbor cells to said communication connection request transmitted hereto.

8. The mobile station as set forth in claim 7, further comprising:
   a first memory adapted to sequentially store the communication qualities of the radio signals of said base stations on the basis of time; and
   a second memory adapted to sequentially store reference communication qualities of the radio signals of said base stations on the basis of time;
   wherein said control section is adapted to select said optimum neighbor cell from said neighbor cells by comparing the communication qualities of the radio signals of said base stations stored in said first memory with the reference communication qualities of the radio signals of said base stations stored in said second memory.

9. The mobile station as set forth in claim 7, wherein the communication qualities of the radio signals of said base stations received by said radio section are electric field strengths of the radio signals thereof.

10. A method for establishing a radio communication connection between a mobile station a plurality of base stations, comprising:
    searching for cells of said base stations to obtain broadcast information of radio signals of said base stations received by a radio section;
    selecting a serving cell of a specified one of said base stations and at least one neighbor cell of other ones of said base stations neighbor to said serving cell in accordance with broadcast information of the radio signals of said base stations;
    transmitting at least one communication connection request to said serving cell; and
    selecting an optimum neighbor cell from said neighbor cells in accordance with communication qualities of the radio signals of said base stations on the basis of time to transmit at least one communication connection request to said optimum neighbor cell, when said control section receives no response to said communication connection request from said serving sell.

11. The method as set forth in claim 10, wherein the communication qualities of the radio signals of said base stations received by said radio section are electric field strengths of the radio signals thereof.

12. The method as set forth in claim 10, wherein said optimum neighbor cell is selected from said neighbor cells by comparing communication qualities of the radio signals of said base stations on the basis of time with reference communication qualities of the radio signals of said base stations on the basis of time.

13. A method for establishing a radio communication connection between a mobile station a plurality of base stations, comprising:
- searching for cells of said base stations to obtain broadcast information of radio signals of said base stations received by a radio section;
- selecting a serving cell of a specified one of said base stations and neighbor cells of other ones of said base stations neighbor to said serving cell in accordance with broadcast information of the radio signals of said base stations;
- transmitting at least one communication connection request to said serving cell; and
- selecting an optimum neighbor cell from said neighbor cells in accordance with communication qualities of the radio signals of said base stations on the basis of time to transmit at least one communication connection request to said serving cell and said optimum neighbor cell, when said control section receives no response to said communication connection request from said serving cell.

14. The method as set forth in claim 13, wherein said optimum neighbor cell is selected from said neighbor cells by comparing communication qualities of the radio signals of said base stations on the basis of time with reference communication qualities of the radio signals of said base stations on the basis of time.

15. The mobile station as set forth in claim 13, wherein the communication qualities of the radio signals of said base stations received by said radio section are electric field strengths of the radio signals thereof.

16. A method for establishing a radio communication connection between a mobile station plurality of base stations, comprising:
- searching for cells of said base stations to obtain broadcast information of radio signals of said base stations received by a radio section;
- selecting a serving cell of a specified one of said base stations and neighbor cells of other ones of said base stations neighbor to said serving cell in accordance with broadcast information of the radio signals of said base stations;
- transmitting at least one communication connection request to said serving cell and one of said neighbor cells; and
- selecting an optimum neighbor cell from said neighbor cells in accordance with communication qualities of the radio signals of said base stations on the basis of time to transmit at least one communication connection request to said optimum neighbor cell, when said control section receives no response to said communication connection request from said serving cell and the one of said neighbor cells.

17. The method as set forth in claim 16, wherein said optimum neighbor cell is selected from said neighbor cells by comparing communication qualities of the radio signals of said base stations on the basis of time with reference communication qualities of the radio signals of said base stations on the basis of time.

18. The mobile station as set forth in claim 16, wherein the communication qualities of the radio signals of said base stations received by said radio section are electric field strengths of the radio signals thereof.

19. A mobile communication system comprising a mobile station, a plurality of base stations and a base station control station connected to said base stations, said mobile station comprising:
- a radio section adapted to communicate with said base stations; and
- a control section connected to said radio section, said control section being adapted to search for cells of said base stations to obtain broadcast information of radio signals of said base stations received by said radio section, select a serving cell of a specified one of said base stations and at least one neighbor cell of other ones of said base stations station neighbor to said serving cell in accordance with broadcast information of the radio signals of said base stations, transmit at least one communication connection request to said serving cell, and select an optimum neighbor cell from said neighbor cells in accordance with communication qualities of the radio signals of said base stations on the basis of time to transmit at least one communication connection request via said optimum neighbor cell to said base station control station, when said control section receives no response to said communication connection request via said serving cell from said base station control station.

20. The mobile communication system as set forth in claim 19, wherein the communication qualities of the radio signals of said base stations received by said radio section are electric field strengths of the radio signals thereof.

21. The mobile communication system as set forth in claim 19, further comprising:
- a first memory adapted to sequentially store the communication qualities of the radio signals of said base stations on the basis of time; and
- a second memory adapted to sequentially store reference communication qualities of the radio signals of said base stations on the basis of time;
- wherein said control section is adapted to select said optimum neighbor cell from said neighbor cells by comparing the communication qualities of the radio signals of said base stations stored in said first memory with the reference communication qualities of the radio signals of said base stations stored in said second memory.

22. A method for establishing a radio communication connection between a mobile station a plurality of base stations, comprising:
- searching for cells of said base stations to obtain broadcast information of radio signals of said base stations received by a radio section;
- selecting a serving cell of a specified one of said base stations and neighbor cells of other ones of said base stations neighbor to said serving cell in accordance with broadcast information of the radio signals of said base stations;
- transmitting at least one communication request to said serving cell;
- selecting an optimum neighbor cell from said neighbor cells in accordance with communication qualities of the radio signals of said base stations on the basis of time to transmit at least one communication connection request via said serving cell and said optimum neighbor cell to said base station control station, when said control section receives no response to said communication connection request via said serving cell from said base control station.

23. The mobile communication system as set forth in claim 22, further comprising:
- a first memory adapted to sequentially store the communication qualities of the radio signals of said base stations on the basis of time; and
- a second memory adapted to sequentially store reference communication qualities of the radio signals of said base stations on the basis of time;
- wherein said control section is adapted to select said optimum neighbor cell from said neighbor cells by comparing the communication qualities of the radio signals of said base stations stored in said first memory with the reference communication qualities of the radio signals of said base stations stored in said second memory.

24. The mobile station as set forth in claim 22, wherein the communication qualities of the radio signals of said base stations received by said radio section are electric field strengths of the radio signals thereof.

25. A method for establishing a radio communication connection between a mobile station a plurality of base stations, comprising:
- searching for cells of said base stations to obtain broadcast information of radio signals of said base stations received by a radio section;
- selecting a serving cell of a specified one of said base stations and neighbor cells of other ones of said base stations neighbor to said serving cell in accordance with broadcast information of the radio signals of said base stations;
- transmitting at least one communication connection request to said serving cell and one of said neighbor cells; and
- selecting an optimum neighbor cell from said neighbor cells in accordance with communication qualities of the radio signals of said base stations on the basis of time to transmit at least one communication connection recluses via said optimum neighbor cell to said base station control stations, when said control section receives no response to said communication connection request via said serving cell and the one of said neighbor cells from said base station control station.

26. The mobile communication system as set forth in claim 25, further comprising:
- a first memory adapted to sequentially store the communication qualities of the radio signals of said base stations on the basis of time; and
- a second memory adapted to sequentially store reference communication qualities of the radio signals of said base stations on the basis of time;
- wherein said control section is adapted to select said optimum neighbor cell from said neighbor cells by comparing the communication qualities of the radio signals of said base stations stored in said first memory with the reference communication qualities of the radio signals of said base stations stored in said second memory.

27. The mobile station as set forth in claim 25, wherein the communication qualities of the radio signals of said base stations received by said radio section are electric field strengths of the radio signals thereof.

* * * * *